US006182284B1

(12) United States Patent
Sreedhar et al.

(10) Patent No.: US 6,182,284 B1
(45) Date of Patent: Jan. 30, 2001

(54) METHOD AND SYSTEM FOR ELIMINATING PHI INSTRUCTION RESOURCE INTERFERENCES AND REDUNDANT COPY INSTRUCTIONS FROM STATIC-SINGLE-ASSIGNMENT-FORM COMPUTER CODE

(75) Inventors: Vugranam C. Sreedhar, Cupertino; Dz-ching Ju, Sunnyvale, both of CA (US); David Mitford Gillies, Bellevue, WA (US); Vatsa Santhanam, Campbell, CA (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/163,677

(22) Filed: Sep. 30, 1998

(51) Int. Cl.[7] ........................................ G06F 9/45
(52) U.S. Cl. ................................... 717/9; 717/8
(58) Field of Search .................... 717/5–9; 712/216, 712/217, 218, 233, 234

(56) References Cited

U.S. PATENT DOCUMENTS

| | | | |
|---|---|---|---|
| 5,659,754 | * | 8/1997 | Grove et al. ............................... 717/9 |
| 5,768,596 | * | 6/1998 | Chow et al. ............................... 717/9 |
| 5,790,867 | * | 8/1998 | Schmidt et al. ........................... 717/9 |
| 5,901,317 | * | 5/1999 | Goebel ..................................... 717/9 |
| 5,937,195 | * | 8/1999 | Ju et al. ................................... 717/9 |
| 5,978,588 | * | 11/1999 | Wallace ................................... 717/9 |
| 5,991,540 | * | 11/1999 | Radigan ................................... 717/9 |
| 6,016,398 | * | 1/2000 | Radigan ................................... 717/9 |
| 6,026,241 | * | 2/2000 | Chow et al. ............................. 717/9 |

OTHER PUBLICATIONS

Aho et al., "Compilers: Principles, Techniques and Tools", Addison–Wesley, 1988, pp. 1.*

Rosen et al., "Global value number and redundant computations", ACM Symp. on POPL, 1988, pp. 12–27.*

Morel et al., "Gobal Optimization by suppression of partial redundancies", Comm. of the ACM, ACM, 1979, pp. 96–103.*

Knoop et al., "Lazy strength reduction", Journal of Programming languages, vol. 1 No. 1 Mar. 1993, pp. 71–91.*

Gerlek et al., "A reference chain approach for live variables", Technical Report No. CS/E 94–029, Oregon Graduate Inst. of Science and Technology, 1994, pp. 1–22.*

Cytrn et al., "Efficiently computing Static Single Assignment form and the control dependence graph", ACM Trans. on Prog. Lang. and Systems, ACM, 1991, pp. 451–490.*

Sreedhar et al. "A linear time algorithm for placing phi–nodes", POPL '95, ACM, 1995, pp. 62–73.*

Koseki et al., "A register allocatiohjn technique using guarded PDG", ICS '96, ACM, 1996, pp. 270–277.*

Sastry et al. , "A new algorithm for scalar register promotion based on SSA form", SIGPLAN '98, ACM, Jun. 1998, pp 15–25.*

* cited by examiner

Primary Examiner—Kakali Chaki

(57) ABSTRACT

A method and system for detecting and eliminating interferences between resources in SSA-form φ-instructions so that an optimizing compiler can translate optimized SSA-form code back to non-SSA-form code. The method traverses the control flow graph associated with an SSA-form program or routine in order to analyze each φ-instruction within the SSA-form program or routine. All possible pairs of resources associated with each φ-instruction are analyzed for interference. Once all interferences have been detected, the method inserts copy instructions into the SSA-form intermediate-level code program or routine in order to eliminate the interferences.

25 Claims, 23 Drawing Sheets

000000# METHOD AND SYSTEM FOR ELIMINATING PHI INSTRUCTION RESOURCE INTERFERENCES AND REDUNDANT COPY INSTRUCTIONS FROM STATIC-SINGLE-ASSIGNMENT-FORM COMPUTER CODE

TECHNICAL FIELD

The present invention relates to computer software compiler programs that translate source-language programs into equivalent compiled programs comprising assembly-language or machine instructions and, in particular, to a method and system for translating optimized, intermediate-level, static-single-assignment-form computer code that includes phi instructions into optimized, intermediate-level computer code without phi instructions.

BACKGROUND OF THE INVENTION

Compilers are programs that translate computer programs written in source languages, such as FORTRAN, Pascal, C, and C++, into equivalent compiled programs consisting of assembly-language instructions or machine-code instructions. Compilers generally perform this translation in a series of distinct steps or phases. Initial phases perform lexical analysis, syntactic analysis, and semantic analysis, generating an intermediate-level translation that includes intermediate-code instructions. Later phases perform various optimizations to produce the final assembly-language or machine-code program. In certain optimization phases, a particular form of intermediate-level code, called static-single-assignment ("SSA") form code, facilitates and simplifies certain types of optimizations. In SSA-form code, each variable, or virtual register, is defined only once. At points in the SSA-form code where branches coalesce, phi instructions ("100 -instructions") are inserted to abstractly coalesce the definitions of a set of virtual registers from various incoming branches. A $\phi$-instruction formally assigns an additional virtual register to the value of the corresponding virtual register defined in the particular program branch that is taken, during execution of the program, to arrive at the point where the various branches coalesce. In a later phase, the SSA-form intermediate-level code is transformed back to a non-SSA-form intermediate-level code by removing the $\phi$-instructions and substituting, throughout the intermediate-level code, a single virtual register for the set of virtual registers coalesced by each $\phi$-instruction. However, the transition from SSA-form intermediate-level code back to non-SSA-form intermediate-level code may be complicated as a result of intervening optimizations, including code motion and copy elimination. Because of these intervening optimizations, certain types of interferences between sets of variables coalesced by different $\phi$-instructions may be produced. These interferences need to be detected and removed prior to the transition from SSA-form intermediate-level code back to non-SSA-form intermediate-level code.

Various algorithms have been proposed for detecting and removing interferences between the variables coalesced by $\phi$-instructions of optimized SSA-form intermediate-level code. In particular, techniques for identifying and removing $\phi$-instruction interferences are described in the following two references: (1) P. Briggs, T. Harvey, and Taylor Simpson, *Static single assignment construction,* Version 1.0, Technical Report, Rice University, July 1995; and (2) R. Cytron, J. Ferrante, B. K. Rosen, M. N. Wegman, and F. K. Zadeck, *Efficiently computing status single assignment form and the control dependence graph, ACM Transactions on Programming Languages and Systems,* 13(4):451–490, October 1991. A detailed discussion of the theory and implementation of compilers can be found in a number of textbooks, including: *Compilers: Principals, Techniques, and Tools,* Aho, Sethi, and Ullman, Addison-Wesley Publishing Company, 1988; and *Advanced Compiler Design & Implementation,* Muchnick, Morgan Kaufmann Publishers, 1997. However, the currently-available algorithms are deficient in various aspects. They employ control flow graph representations and interference graphs, but do so by identifying and including algorithms for a number of different structural properties of the control flow graphs and interference graphs. This "special casing" approach suffers the disadvantage that, because there are potentially infinitely many different structural properties of control flow graphs and interference graphs that might require special-case algorithms, a "special case" approach cannot be proven to be correct for all control flow graphs and interference graphs that might arise in SSA-form intermediate-level code. Another disadvantage of currently-available algorithms is that they need to consider intermediate-level code instructions and traverse the control flow and interference graphs in certain predefined orders. This ordering requirement greatly complicates the algorithms. Finally, the currently-available algorithms remove $\phi$-instruction interferences by introducing copy instructions, but end up inserting more copy instructions into the intermediate-level code than are strictly required to remove the $\phi$-instruction interferences. These unnecessary copy instructions increase both the time required for execution and the size of the final assembly-language or machine-code program produced by the compiler.

A need has therefore been recognized in the area of compiler optimization for an improved method for eliminating $\phi$-instruction interferences and for eliminating redundant copy instructions from SSA-form intermediate-level code. This improved method should provide a uniform framework that does not require any "special casing" approaches. The improved method should not impose any requirements either for traversing control flow graphs and interference graphs or for considering $\phi$-instructions within the intermediate-level SSA-form code in particular orders. The improved method should not insert large numbers of redundant and unnecessary copy instructions into the SSA-form intermediate-level code to remove the interferences between $\phi$-instructions.

SUMMARY OF THE INVENTION

The present invention provides a uniform framework for eliminating interferences between variables used in $\phi$-instructions in SSA-form intermediate-level code and a uniform framework for eliminating redundant copy instructions from SSA-form intermediate-level code. Phi congruence classes interrelate variables used in multiple $\phi$-instructions. An interference graph indicates pairs of variables that are both live at some point in the SSA-form intermediate-level code. The present invention detects interferences between the variables used in $\phi$-instructions by constructing phi congruence classes and by analyzing the phi congruence classes, together with an interference graph and sets of variables that are live at the beginning and end of basic blocks within the SSA-form intermediate-level code. The detected $\phi$-instruction interferences are eliminated by inserting copy instructions into basic blocks that precede and include $\phi$-instructions. Redundant copy instructions can be removed from the SSA-form intermediate-level code by considering the interference graph and by comparing the members of the phi congruence classes associated with the variables used in the copy instructions. The method of the present invention does not impose any order requirements on considering φ-instructions or traversing control flow graphs, and does not require consideration of special structural forms of the control flow graphs, thus avoiding using a "special casing" approach to eliminating φ-instruction interferences and redundant copies, and inserts fewer copy instructions than are inserted by currently-available algorithms.

DETAILED DESCRIPTION OF THE INVENTION

Figure 1:
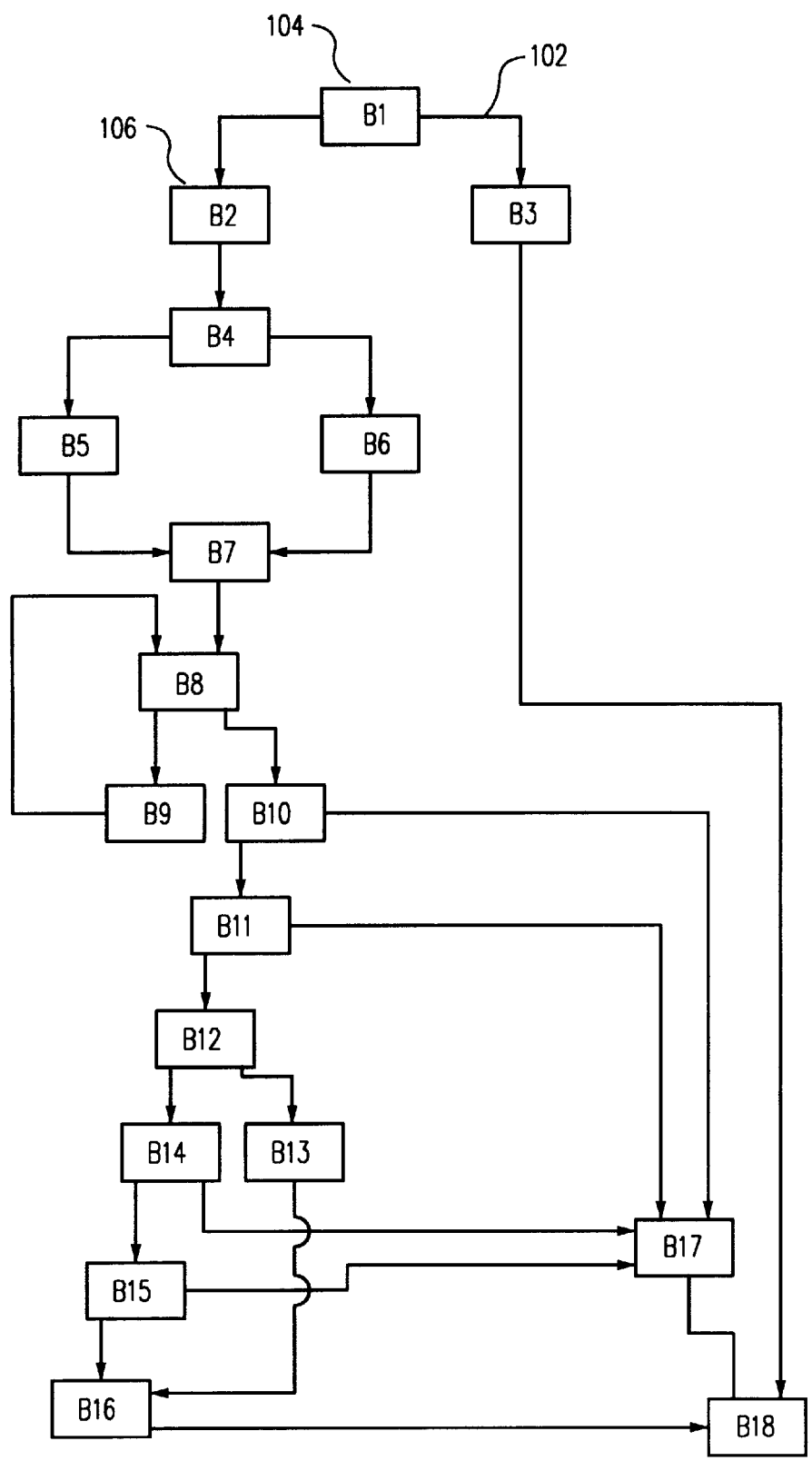
FIG. 1 shows a control flow graph that represents the intermediate-level code version of the routine "skewed."

The present invention will be described below following two initial subsections. The first subsection introduces SSA-form code, control-flow-graph representation of SSA-form code, interference-graph representation of variable interferences in SSA-form code, and φ-instruction resource interferences arising from copy elimination and code motion optimizations. This introduction will be presented along with a series of examples that illustrate how φ-instruction resource interferences, addressed by the present invention, arise during optimization. The second subsection presents illustrated examples of the different types of φ-instruction resource interferences that arise during optimization of SSA-form code. A pseudo-code implementation of the present invention follows in the third subsection. A fourth subsection illustrates the redundant copy elimination problem with an example and provides a pseudo-code implementation of a method for identifying redundant copies. Finally, in a fifth subsection, solution of the "lost copy" and "swap" problems are described.

Introduction

A short, pseudo-code routine, called "skewed," is provided below:

```
1   int skewed (int *scores, int num_scores)
2   {
3       int first, last, mid, sum, i, average, high, x, several;
4
5       if (num_scores <= 0) return - 1;
6       else
7       {
8           x = scores[num_scores - 1];
9           first = scores[0];
10          if (num_scores == 1)
11          {
12              last = first;
13              several = FALSE;
14          }
15          else
16          {
17              last = x;
18              several = TRUE;
19          }
20          mid = (first + last) / 2;
21          sum = 0;
22          for (i = 0; i < num_scores; i++)
23          {
24              sum += scores[i];
25              high = scores[i];
26          }
27          average = sum / num_scores;
28          if (high > 2 * mid || high > 2 * average ||
29              (several && (high > 100 || mid > 96))) return 1;
30          else return 0;
31      }
32  }
```

On line 1, this program receives, as arguments, a pointer to the first element of an array of integers, called "scores," and an integer "num_scores" that represents the number of valid scores contained in the array "scores." This program is purposely written to be inefficient in order to demonstrate, below, interferences that arise from certain optimizations.

If there are no scores in the array "scores," then the routine "skewed" returns "−1" on line 5. Otherwise, the routine "skewed" computes the midpoint of the scores stored in the array on line 20 and places the midpoint score in the variable "mid." The scores in the array "scores" are assumed to be arranged in ascending order. Then, on lines 21–27, the routine "skewed" computes the average of the scores. Finally, on lines 28–29, the routine "skewed" returns "1" if the highest score in the array "scores" exceeds either the computed midpoint score or the computed average by more than a factor of 2, or there are two or more scores in the array num_scores and the highest score is greater than 100 or the midpoint score is greater than 96. Otherwise, on line 30, the routine "skewed" returns "0," indicating that scores are not skewed.

The routine "skewed" rather inefficiently computes the midpoint score on line 20 by saving the first score of the array "scores" in the local variable "first," on line 9, and the last score in the array "scores" in the local variable "last," on lines 12 or 17. The midpoint score can be more efficiently calculated in the following single statement:

mid=(scores[0]+scores[num_scores −1])/2

An additional problem with the routine "skewed" occurs on line 25. The local variable "high" is meant to store the value of the highest score in the array "scores." However, that highest score can be obtained once, rather than repeatedly obtained within the for loop including lines 22–26.

A pseudo-intermediate-code version of the routine "skewed" is shown below. The instruction formats and meanings will be described in detail following the routine "skewed." It should be noted that the target for an instruction in this pseudo-intermediate-code generally is specified as the first operand of the instruction, and the source or sources for an instruction generally are specified as the second and subsequent operands. Approximate source code lines of the routine "skewed" to which the pseudo-intermediate-code instructions correspond are provided as comments, following the comment symbol "//."

```
1    skewed:         cmp     r3, #0          //5
2                    ble     L1              //5
3                    br      L2              //5
4         L1:        mov     r1, #−1         //5
5                    br      L10             //5
6         L2:        dec     s1, r3          //6
7                    lshft   s1, #2          //6
8                    mov     s2, s1(r2)      //6
9                    mov     s3, #0(r2)      //7
10                   cmp     r3, #1          //8
11                   beq     L3              //8
12                   mov     s4, s2          //17
13                   mov     s5, #1          //18
14                   br      L4              //18
15        L3:        mov     s4, s3          //12
16                   mov     s5, #0          //13
17        L4:        add     s6, s3, s4      //20
18                   rshft   s6, #1          //20
19                   clr     s7              //21
20                   clr     s8              //22
21        L5:        cmp     r3, s8          //22
22                   bge     L6              //22
23                   mov     s9, s8          //24
24                   lshft   s9, #2          //24
25                   add     s7, s7, s9(r2)  //24
26                   mov     s10, s9(r2)     //25
27                   inc     s8, s8          //22
28                   br      L5              //22
29        L6:        mov     s11, s7         //27
30                   div     s11, s11, r3    //27
31                   mov     s12, s6         //28
32                   lshft   s12, #2         //28
33                   mov     s13, s11        //28
34                   lshft   s13, #2         //28
35                   cmp     s10, s12        //28
36                   bgt     L9              //28
37                   cmp     s10, s13        //28
38                   bgt     L9              //28
39                   cmp     s5, #0          //29
40                   bne     L7              //29
41                   br      L8              //29
42        L7:        cmp     s10, #100       //29
43                   bgt     L9              //29
44                   cmp     s6, #96         //29
45                   bgt     L9              //29
46        L8:        mov     r1, #0          //30
47                   br      L10             //30
48        L9:        mov     r1, #1          //29
49        L10:       jmp     r0
```

This intermediate-code version of the routine "skewed" is written in a generic pseudo-intermediate-assembly-language. The first instruction on line 1 of the intermediate-code version of "skewed" includes the label "skewed" and the instruction "cmp r3, #0." Labels are used as symbolic addresses for target instructions of branch instructions. An instruction, like the above-quoted first instruction, comprises an operation code ("op code") and 0, 1, or more operands. Operands may include labels, registers, virtual registers, and literal values. In the case of the first instruction, the op code is "cmp" and the two operands are register "r3" and the integer value "0." The first instruction is a compare instruction that compares the contents or register "r3" with the literal value 0. The second instruction, "ble L1," is a branch instruction that causes control to flow to the instruction labeled by label "L1" if the preceding compare instruction indicates that the contents of register "r3" are equal to or less than 0. Register operands are designated by an "r" followed by a numeral. They symbolize actual machine registers. Virtual register operands are indicated by an "s" followed by a numeral. Virtual registers are replaced by actual registers during a register assignment phase of compilation. Labels, other than the initial label "skewed," are designated by an "L" followed by a numeral. Finally, literal values are designated by a "#" symbol followed by a numeric representation of the value. Instruction op codes used in the intermediate-level assembly code version of the routine "skewed" include: (1) "cmp," an operation that compares two values; (2) "beq," an operation that causes a branch to another instruction within the program specified by a label when a preceding "cmp" operation determines that the two compared values are identical; (3) "br," an operation that causes an unconditional branch to a labeled instruction; (4) "mov," an operation that copies a value from a source operand to a destination operand; (5) "dec," an operation that decrements the value of a second operand and stores the result into the register or virtual register specified by a first operand; (6) "lshft," an operation that arithmetically left-shifts the value stored in the register specified by a first operand by the number of places specified by a second operand; (7) "rshft," an analogous operation to the previously described operation "lshft," except that the arithmetic shift is in the right hand direction; (8) "clr," an operation that sets the value of an operand to "0"; (9) "bge," an operation that branches to a labeled instruction when a preceding compare instruction determines that the value of a second operand is greater than or equal to the value of a first operand; (10) "add," an operation that adds the values specified by a second and a third operand and places the result into a first operand; (11) "inc," an operation that increments the value stored in the second operand by 1 and places the result in the first operand; (12) "div," an operation that divides the value specified by a second operand by the value specified by a third operand and stores the result in a first operand; (13) "bgt," an operation that branches to a labeled instruction when a previous compare instruction determines that the value of a second operand is greater than the value of a first operand; (14) "jmp," an operation that unconditionally branches to a location specified by an operand; and (15) "ble," an operation that causes a branch to another instruction within the program specified by a label when a preceding "cmp" operation determines that the first compared value is identical or less than the second compared value. The notation "r1(r2)" specifies the value of a memory location addressed by the contents of register "r2" plus an offset stored in register "r1." This indirect memory addressing is used for accessing values.

Note that registers "r0," "r1," "r2," and "r3" have special significance that is defined by the compiler that generates the pseudo-intermediate-level code. Register "r0" contains the return address to which execution control is transferred when the routine has finished. Register "r1" contains the return value returned by the routine "skewed." Register "r2" contains the address of the first element of the array "scores," passed to the routine as the first argument, and register "r3" contains the value "num_scores" passed to the routine as the second argument.

The above-described intermediate-level assembly-language version of the routine "skewed" is shown below, in Table 1, with horizontal dashed lines separating various groups of instructions.

TABLE 1

| 1 | | cmp | r3, #0 | //B1 |
|---|---|---|---|---|
| 2 | | ble | L1 | |
| 3 | | br | L2 | //B2 |
| 4 | L1: | mov | r1, #−1 | //B3 |
| 5 | | br | L10 | |
| 6 | L2: | dec | s1, r3 | //B4 |
| 7 | | lshft | s1, #2 | |
| 8 | | mov | s2, s1(r2) | |
| 9 | | mov | s3, #0(r2) | |
| 10 | | cmp | r3, #1 | |
| 11 | | beq | L3 | |
| 12 | | mov | s4, s2 | //B5 |
| 13 | | mov | s5, #1 | |
| 14 | | br | L4 | |
| 15 | L3: | mov | s4, s3 | //B6 |
| 16 | | mov | s5, #0 | |
| 17 | L4: | add | s6, s3, s4 | //B7 |
| 18 | | rshft | s6, #1 | |
| 19 | | clr | s7 | |
| 20 | | clr | s8 | |
| 21 | L5: | cmp | r3, s8 | //B8 |
| 22 | | bge | L6 | |
| 23 | | mov | s9, s8 | //B9 |
| 24 | | lshft | s9, #2 | |
| 25 | | add | s7, s7, s9(r2) | |
| 26 | | mov | s10, s9(r2) | |
| 27 | | inc | s8, s8 | |
| 28 | | br | L5 | |
| 29 | L6: | mov | s11, s7 | //B10 |
| 30 | | div | s11, s11, r3 | |
| 31 | | mov | s12, s6 | |
| 32 | | lshft | s12, #2 | |
| 33 | | mov | s13, s11 | |
| 34 | | lshft | s13, #2 | |
| 35 | | cmp | s10, s12 | |
| 36 | | bgt | L9 | |

TABLE 1-continued

| 37 | | cmp | s10, s13 | //B11 |
|---|---|---|---|---|
| 38 | | bgt | L9 | |
| 39 | | cmp | s5, #0 | //B12 |
| 40 | | bne | L7 | |
| 41 | | br | L8 | //B13 |
| 42 | L7: | cmp | s10, #100 | //B14 |
| 43 | | bgt | L9 | |
| 44 | | cmp | s6, #96 | //B15 |
| 45 | | bgt | L9 | |
| 46 | L8: | mov | r1, #0 | //B16 |
| 47 | | br | L10 | |
| 48 | L9: | mov | r1, #1 | //B17 |
| 49 | L10: | jmp | r0 | //B18 |

The groups of instructions separated by horizontal dashed lines are called "basic blocks," and are labeled in Table 1 with a "B" followed by a numeral. A basic block is a contiguous group of instructions that start with an instruction that may be the target of a branch or jump instruction or that may be reached during sequential execution of the instructions of the routine. No other instruction within a basic block, other than the first instruction, can be the target of a branch or jump instruction. No instruction within a basic block, other than the last instruction in the basic block, can transfer execution control from within the basic block to an instruction outside of the basic block. Thus, all the instructions in a basic block execute in sequence after the first instruction of the basic block is executed. For example, the "dec," "lshft," "mov," "mov," "cmp," and "beq" instructions on lines 6–11 in Table 1 together comprise basic block "B4" because the "dec" instruction on line 6 is the target of the "br" instruction on line 3, and because the "beq" instruction on line 11 is a branch instruction. Many compiler techniques are simplified by considering basic blocks rather than individual instructions. In essence, a basic block can be considered a sort of meta instruction that can either be executed or not executed, depending on the flow of control during execution of a program.

An important characterization of a program is a control flow graph. FIG. 1 shows a control flow graph that represents the intermediate-level assembly-language version of the routine "skewed." The nodes in the control flow graph of FIG. 1 correspond to basic blocks of the intermediate-level assembly-language routine shown in Table 1. The edges linking the nodes, shown by arrows in FIG. 1, such as arrow 102, represent possible transfer of execution control by the last instruction of one basic block to the first instruction of another basic block. For example, the "ble" instruction on line 2 of Table 1, the last instruction of basic block "B1," may transfer control to the "mov" instruction on line 4, the first instruction of basic block "B3." However, if the "ble" instruction on line 2 does not transfer execution control to basic block "B3," execution control is automatically transferred to the "br" instruction on line 3, the first instruction of basic block "B2," by virtue of the sequential nature of program execution. Thus, in FIG. 1, the node representing basic block "B1" 104 is shown with edges pointing to basic block "B3" 102 and to basic block "B2" 106.

Figure 2:
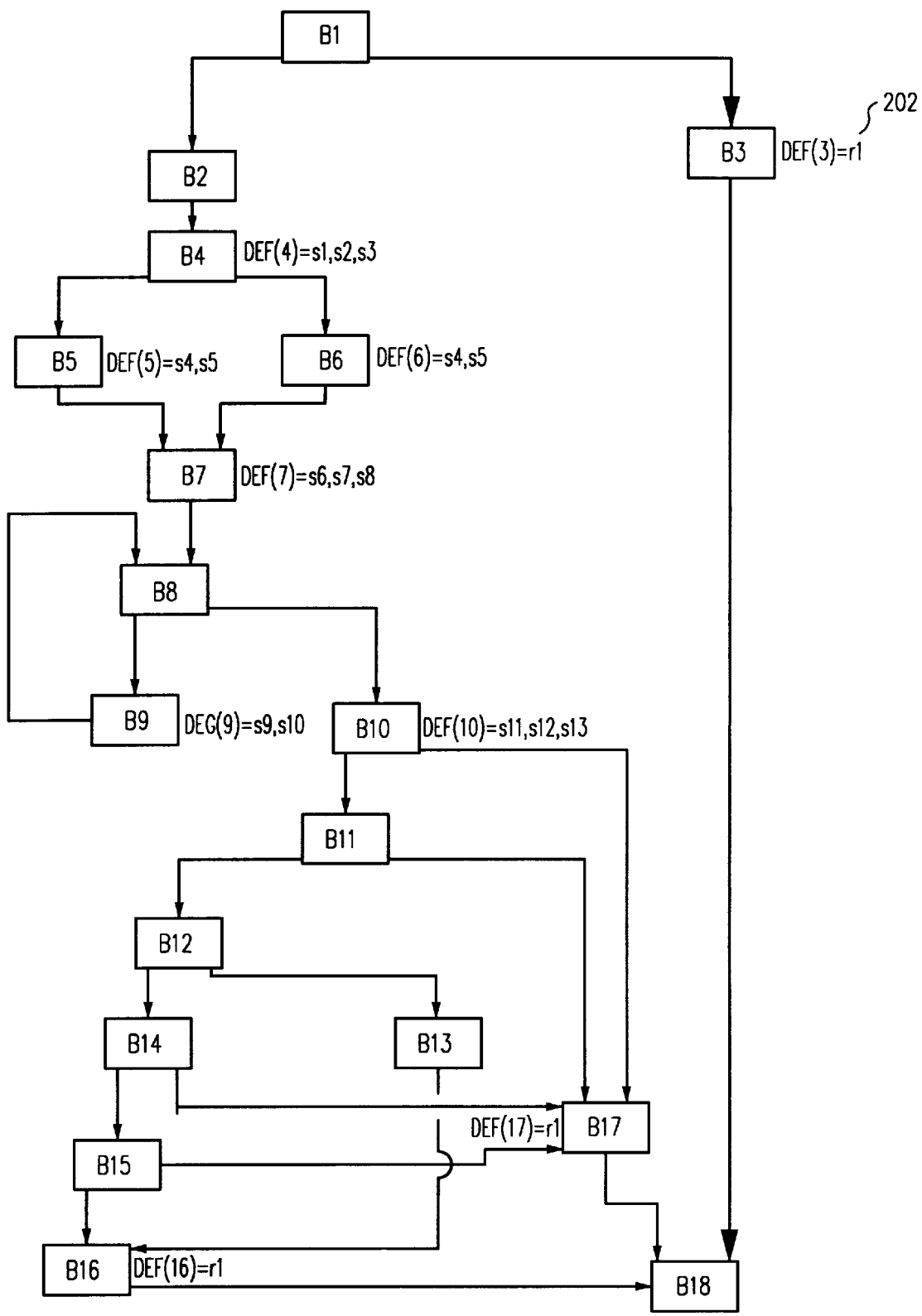
FIG. 2 shows the DEF(i) lists for each of the basic blocks of the control flow graph for the intermediate-level code version of the routine "skewed."

The basic control flow graph, shown in FIG. 1, can be augmented with lists of variables, or registers, that are live at the beginning and the end of each basic block by a process known as "live variable analysis." Live variable analysis is carried out in several steps. In the first step, for each basic block, a set of variables, or registers, that are defined in the basic block before they are used, if at all, in the basic block are associated with the basic block. A set of these defined variables for basic block i is designated as "DEF(i)." FIG. 2 shows the DEF(i) lists for each of the basic blocks of the control flow graph of FIG. 1. For example, the instruction on line 4 of Table 1 defines the value of register "r1" to be "−1." Since this is the first instruction of basic block "B3," and since the only other instruction in basic block "B3" is a branch instruction, on line 5, DEF(3) is equal to "r1." In FIG. 2, the one-element list "r1" 202 represents DEF(3). The DEF(i) for the remaining basic blocks in FIG. 2 are similarly shown as lists of registers and virtual registers. For those basic blocks in FIG. 2 without lists, the DEF(i) are empty.

Figure 3:
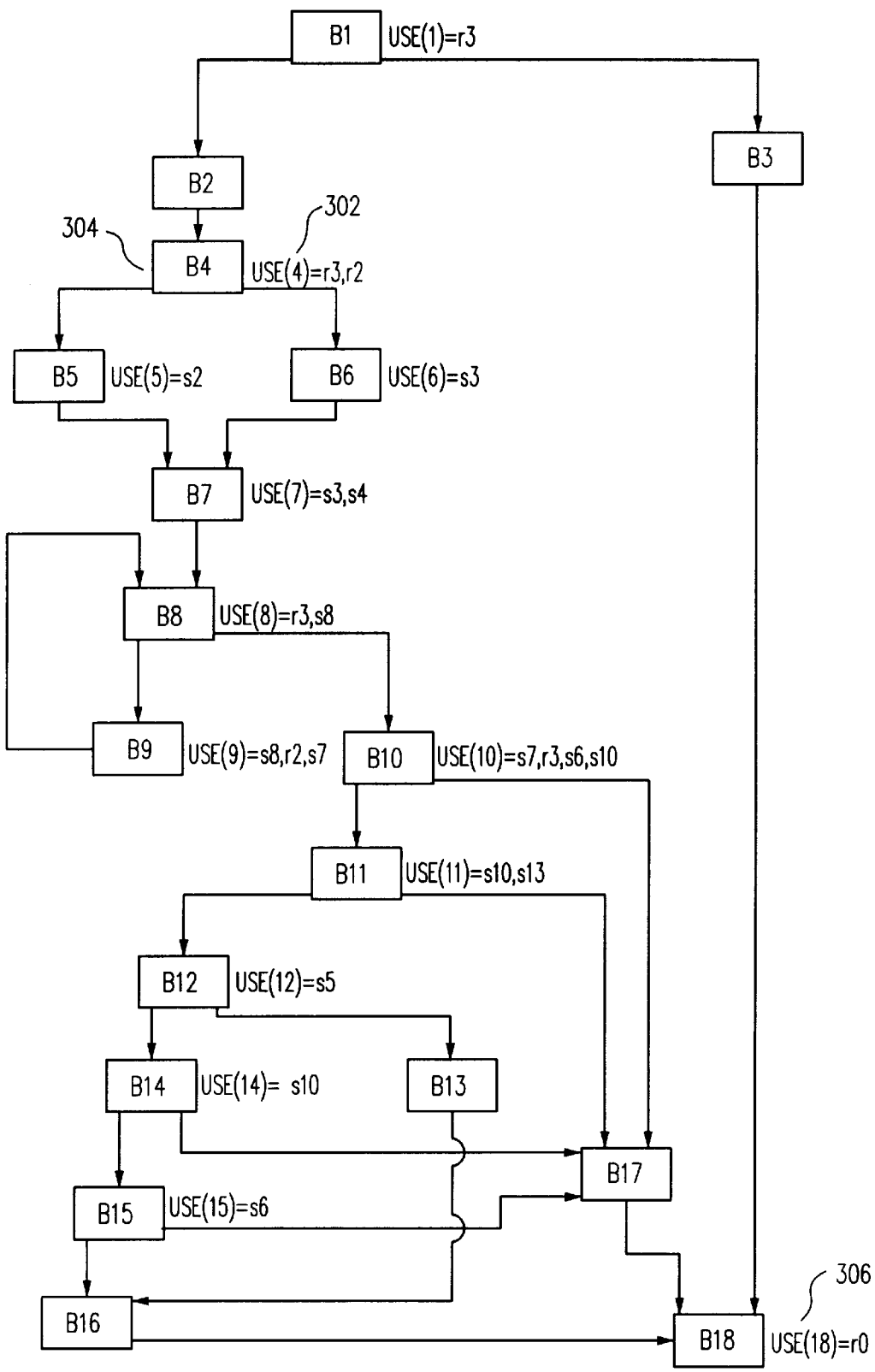
FIG. 3 shows the USE(i) lists associated with each of the basic blocks of the control flow graph for the intermediate-level code version of the routine "skewed."

In a second step of live variable analysis, sets of variables called "USE(i)" for each basic block i are generated. The set "USE(i)" for basic block i contains variables, or registers, that are used before they are defined, if at all, in basic block i. FIG. 3 shows the "USE" sets that correspond to the basic blocks of the control flow graph for the intermediate-level assembly-language version of the routine "skewed." For example, in basic block "B4" of Table 1, register "r3" is used in the "dec" instruction on line 6 and register "r2" is used in the "mov" instruction on line 8. Neither register "r2" nor register "r3" are defined in basic block "B4." In other words, no instructions occur in basic block "B4" which set or change the values of registers "r2" and "r3." Therefore, USE(4) equals registers "r2" and "r3," as indicated in FIG. 3 by the USE(4) notation 302 associated with basic block "B4" 304. The USE sets for the remaining basic blocks are similarly indicated in FIG. 3.

In the final step of live variable analysis, the two sets "LiveIn" and "LiveOut" are calculated for each basic block in the control program. The LiveIn set is the set of variables, or registers, that are live upon entrance to a basic block. The LiveOut set is the set of variables, or registers, that are live at the exit of a basic block. A variable is "live" at a particular point in a program if there is a path to the exit of the program along which its value may be used before it is redefined. A variable is "dead" at that point if there is no such path. Thus, a variable is live at the exit of a basic block if it is live at the entry to any of the basic block's successor basic blocks in the control flow graph. Similarly, a variable is live on entry to a basic block if it is live at the exit of the basic block and not in the DEF set associated with the basic block, or if the variable is in the USE set associated with the basic block. The sets LiveIn and LiveOut can thus be calculated starting with the final basic block of a control flow graph and working back iteratively to the beginning of the control flow graph.

Figure 4:
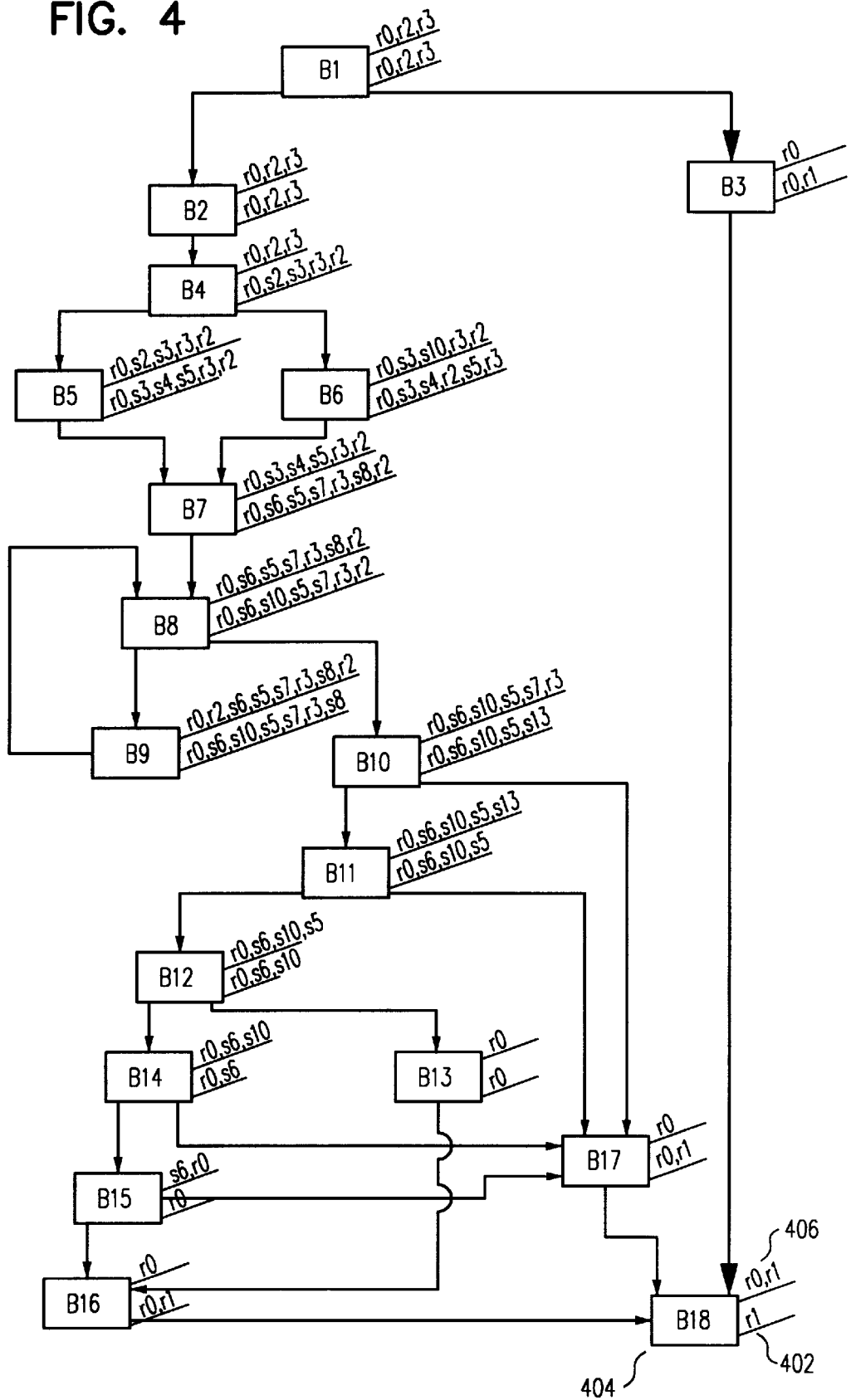
FIG. 4 shows the LiveIn and LiveOut sets for each of the basic blocks in the control flow graph of FIG. 1.

FIG. 4 shows the LiveIn and LiveOut sets for each of the basic blocks in the control flow graph of FIG. 1. For example, the LiveOut set 402 for the final basic block "B18" 404 in FIG. 4 includes only register "r1," since the routine "skewed" returns the calculated return value in register "r1" to a calling routine. For this example, it is assumed that this return value is used in the calling routine. The LiveIn set for basic block "B18" 406 includes register "r0," since register "r0" is in the USE(18) set (306 in FIG. 3) and also includes register "r1," since register "r1" is in the LiveOut set 402 and is not in DEF(18) (see FIG. 2). The LiveIn and LiveOut sets for basic blocks "B1"–"B17" are similarly shown in FIG. 4.

Figure 5:
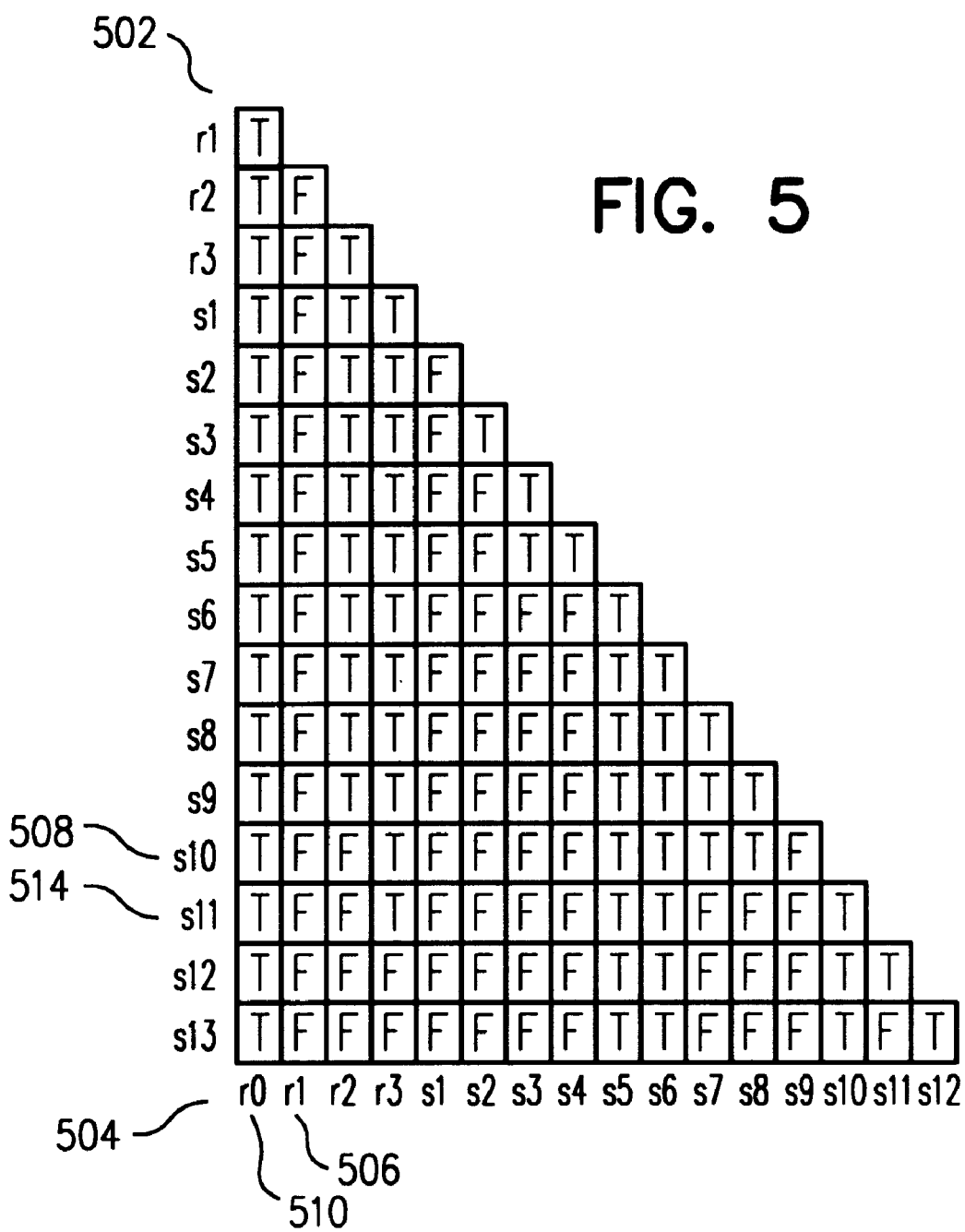
FIG. 5 shows the interference graph for the intermediate-level code version of the routine "skewed."

While a control flow graph represents the various execution paths within a routine or program, possibly augmented by the LiveIn and LiveOut sets, an interference graph represents interferences between variables within a routine or program. One variable interferes with another variable if, at any point in a program or routine, both variables are simultaneously live. Interference graphs are commonly represented as diagonal matrices containing Boolean truth values or as nodes graphically interconnected by edges. FIG. 5 shows the diagonal matrix form of the interference graph for the intermediate-level assembly-language version of the routine "skewed." The interference graph of FIG. 5 is labeled in the vertical direction 502 and in the horizontal direction 504 with the registers and virtual registers used in the routine "skewed." The Boolean truth value at the intersection of each row and column indicates whether the register associated with the row and the register associated with the column interfere anywhere in the routine "skewed." For example, the interference graph of FIG. 5 indicates that register "r1" 506 and virtual register "s10" 508 do not interfere with each other, whereas register "r0" 510 and virtual register "s11" 514 do interfere with each other. This latter interference can be seen in the intermediary-level assembly-language version of the routine "skewed" in Table 1. Virtual register "s11" is defined on line 29 in basic block "B10," in Table 1. With reference to FIG. 4, it is easily seen that register "r0" is in both the LiveIn and LiveOut sets for basic block "B10." Because virtual register "s11" and register "r0" are both simultaneously live in basic block "B10," they interfere with one another in the routine "skewed."

An SSA-form intermediate-code version of the routine "skewed" is provided below:

```
1     skewed           cmp      r3, #0
2                      ble      L1
3                      br       L2
4          L1:         mov      r1₁, #−1
5                      br       L10
6          L2:         dec      s1, r3
7                      lshft    s1, #2
8                      mov      s2, s1(r2)
9                      mov      s3, #0(r2)
10                     cmp      r3, #1
11                     beq      L3
12                     mov      s4₁, s2
13                     mov      s5₁, #1
14                     br       L4
15         L3:         mov      s4₂, s3
16                     mov      s5₂, #0
17         L4:         s4₃ = φ(s4₁:B5, s4₂:B6)
18                     s5₃ = φ(s5₁:B5, s5₂:B6)
19                     add      s6, s3, s4₃
20                     rshft    s6, #1
21                     clr      s7
22                     clr      s8₁
23         L5:         s8₃ = φ(s8₁:B4, s8₂:B7)
24                     cmp      r3, s8₃
25                     bge      L6
26                     mov      s9, s8₃
27                     lshft    s9, #2
28                     add      s7, s7, s9(r2)
29                     mov      s10, s9(r2)
30                     inc      s8₂, s8₃
31                     br       L5
32         L6:         mov      s11, s7
33                     div      s11, s11, r3
34                     mov      s12, s6
35                     lshft    s12, #2
36                     mov      s13, s11
37                     lshft    s13, #2
38                     cmp      s10, s12
39                     bgt      L9
40                     cmp      s10, s13
41                     bgt      L9
```

-continued

```
42              cmp     s5, #0
43              bne     L7
44              br      L8
45      L7:     cmp     s10, #100
46              bgt     L9
47              cmp     s6, #96
48              bgt     L9
49      L8:     mov     rl₂, #0
50              br      L10
51      L9:     mov     rl₃, #1
52      L10:    rl₄ = φ(rl₁:B3, rl₂:B16, rl₃:B17)
53              jmp     r0
```

Figure 6:
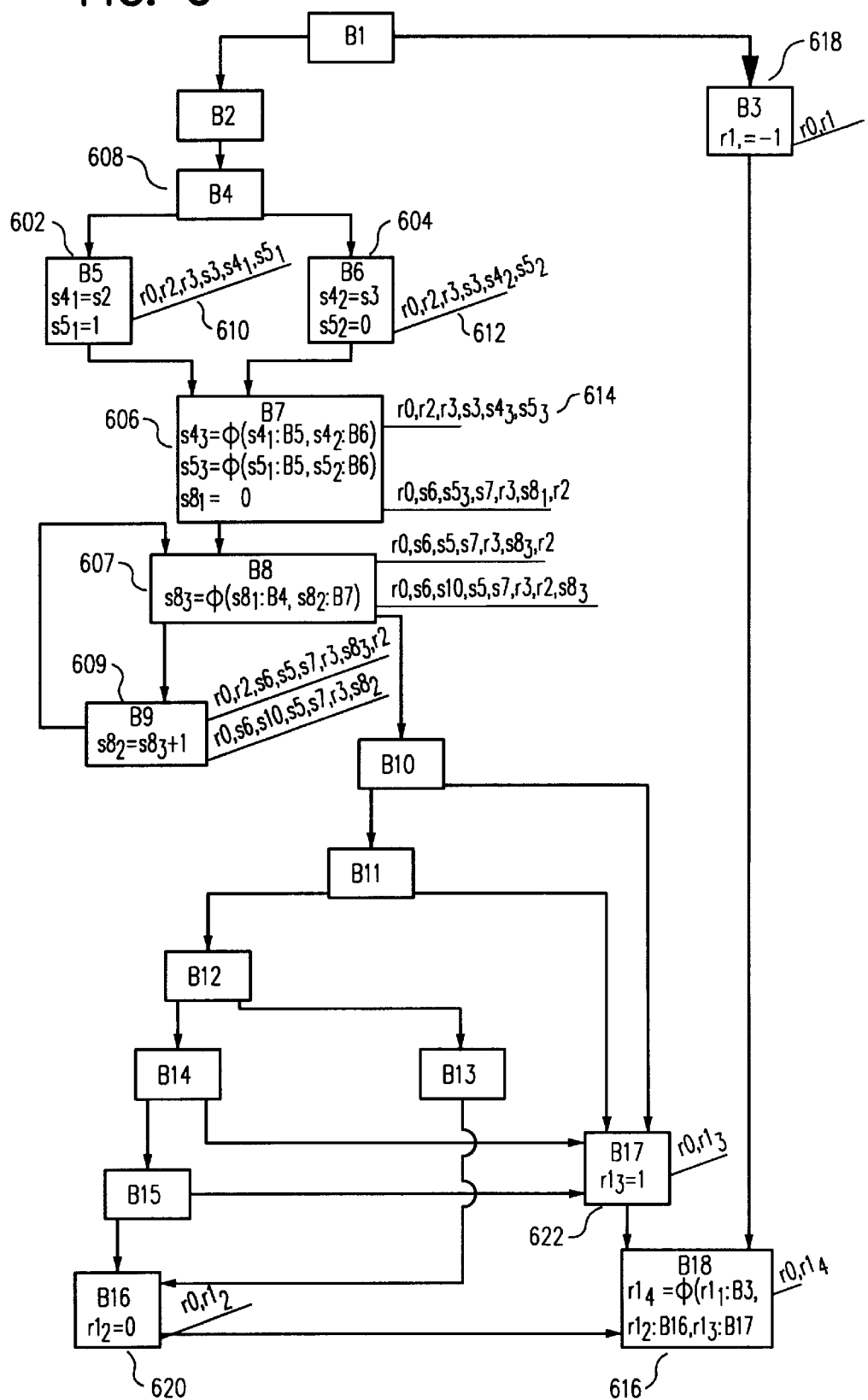
FIG. 6 shows the control flow diagram for the SSA-form code version of the routine "skewed."

FIG. 6 shows the control flow diagram for the above-provided SSA intermediate-code version of the routine "skewed." Only certain of the LiveIn and LiveOut sets that differ substantially from the LiveIn and LiveOut sets of the non-SSA-form intermediate-code version of the routine "skewed" are shown in FIG. 6. In the SSA-form of the routine "skewed," multiple definitions of any particular variable, or register, are eliminated, and coalescing φ-instructions have been inserted. For example, the virtual register "s4" is defined both on line 12 and on line 15 of the non-SSA version of the routine "skewed." Virtual register "s4" corresponds to the local variable "last" of the source-language version of the routine "skewed" that is defined both on line 12 and on line 17 of the source-language version of the routine "skewed." In the above SSA-form version of the routine "skewed," virtual register "s4" is replaced by the subscripted virtual registers "s4₁" and s4₂" on lines 12 and 15. Referring to FIG. 6, the definition of subscripted virtual register "s4₁" occurs in basic block 5 602, whereas the definition of the subscripted virtual register "s4₂" occurs in basic block 6 604. During any given execution of the routine "skewed," control may flow from basic block "B4" 608 either through basic block "B5" or through basic block "B6" before the flow of control coalesces from either basic block "B5" or basic block "B6" at basic block "B7" 606. A φ-instruction has been inserted at the beginning of basic block "B7" 606, as seen above on line 17 of the SSA-form of the routine "skewed." The φ-instruction assigns a value to a third subscripted virtual register "s4₃."

The φ-instruction is an abstract notation indicating that the subscripted virtual register "s4₃" is assigned either the value of subscripted virtual register "s4₁," if the φ-instruction is reached via basic block "B5" 602, or is assigned the value contained in subscripted register "s4₂" if the φ-instruction is reached via basic block "B6" 604. Virtual registers "s4₁" and "s4₂" are paired in the φ-instruction with the labels of the basic blocks that precedes the basic block containing the φ-instruction and from which the virtual registers reach the basic block containing the φ-instruction, in this case basic blocks "B5" and "B6," respectively.

Generally, φ-instructions are not implemented in hardware. They, and the subscripted virtual registers, are simply a notational device to eliminate multiple definitions of any given register or virtual register.

Note, in FIG. 6, that the subscripted virtual registers "s4₁" and "s4₂" are defined to be in the LiveOut sets 610 and 612 for basic blocks "B5" and "B6" 602 and 604 in which they are assigned values. The subscripted virtual registers are not, however, in the LiveIn set 614 of basic block "B7" in which the coalescing φ-instruction is located. Moreover, the target of the φ-instruction, subscripted virtual register "s4₃," is defined to be in the LiveIn set 614 of basic block "B7" 606 in which the φ-instruction occurs.

A second φ-instruction has been inserted into basic block "B7" 606 to coalesce subscripted registers "s5₁," inserted into basic block "B5" 602 and "s5₂," inserted into basic block "B6" 604, a third φ-instruction has been inserted into basic block "B8" 607 to coalesce subscripted virtual registers "s8₁," inserted into basic block "B7" 606 and "s8₂," inserted into basic block "B9" 609 and a fourth φ-instruction has been inserted into basic block "B18" 616 to coalesce subscripted registers "r1₁" inserted into basic block "B3" 618, "r1₂" inserted into basic block "B16" 620, and "r1₃" inserted into basic block "B17" 622. The LiveOut sets for basic blocks "B3," "B7," "B8," "B9," "B16" and "B17" have been accordingly modified, as have the LiveIn sets for basic blocks "B8," "B9," and "B18", according to the definition for modifying LiveIn and LiveOut sets described above.

SSA-form provides a convenient intermediate-code representation of a routine or program for certain optimization phases employed by a compiler to generate smaller and faster running code. These optimizations may include the elimination of redundant copy instructions and movement of one or more instructions from an original location within a program or routine to another location within a program or routine in order to improve efficiency of execution. A somewhat optimized version of the SSA-form of the routine "skewed" is shown below:

```
1       skewed          cmp     r3, #0
2                       ble     L1
3                       br      L2
4       L1:             mov     rl₁, #-1
5                       br      L10
6       L2:             dec     s1, r3
7                       lshft   s1, #2
8                       mov     s2, s1(r2)
9                       mov     s3, #0(r2)
10                      cmp     r3, #1
11                      beq     L3
12                      mov     s4₁, s2
13                      mov     s5₁, #1
14                      br      L4
15      L3:             mov     s5₂, #0
16      L4:             s4₃ = φ(s4₁:B5, s3:B4)
17                      s5₃ = φ(s5₁:B:B5, s5₂:B6)
18                      add     s6, s3, s4₃
19                      rshft   s6, #1
20                      clr     s7
21                      clr     s8₁
22      L5:             s8₃ = φ(s8₁:B4, s8₂:B7)
23                      cmp     r3, s8₃
24                      bge     L6
25                      mov     s9, s8₃
26                      lshft   s9, #2
27                      add     s7, s7, s9(r2)
28                      inc     s8₂, s8₃
29                      br      L5
30      L6:             mov     s10, s9(r2)
31                      mov     S11, S7
32                      div     s11, s11, r3
33                      mov     s12, s6
34                      lshft   s12, #2
35                      mov     s13, s11
36                      lshft   s13, #2
37                      cmp     s10, s12
38                      bgt     L9
39                      cmp     s10, s13
40                      bgt     L9
41                      cmp     s5, #0
42                      bne     L7
43                      br      L8
44      L7:             cmp     s10, #100
45                      bgt     L9
46                      cmp     s6, #96
47                      bgt     L9
48      L8:             mov     rl₂, #0
49                      br      L10
```

```
50      L9:     mov         rl₃, #1
51      L10:    rl₄ = φ(rl₁:B3, rl₂:B16, rl₃:B17)
52              jmp         r0
```

One optimization that has occurred is the elimination of the "mov" instruction on line 15 of the non-optimized version of the routine "skewed." This "mov" instruction essentially copies the value stored in virtual register "s3" into subscripted virtual register "s4₂". By removing this copy instruction, and placing virtual register "s3" directly into the φ-instruction in the optimized SSA version of the routine "skewed," on line 16, the execution of a copy instruction is avoided and the optimized version of the routine "skewed" will therefore execute more quickly. Another optimization that has occurred is that the "mov" instruction on line 29 of the non-optimized SSA-form of the routine "skewed" has been moved out of the for loop comprising lines 22–31 to the first location in basic block "B10" on line 30 of the optimized version of the routine "skewed." This is an example of code motion, corresponding to moving the statement on line 25 of the source-language version of the routine "skewed" outside of the for loop comprising lines 22–26 so that it is not unnecessarily executed multiple times.

Figure 7:
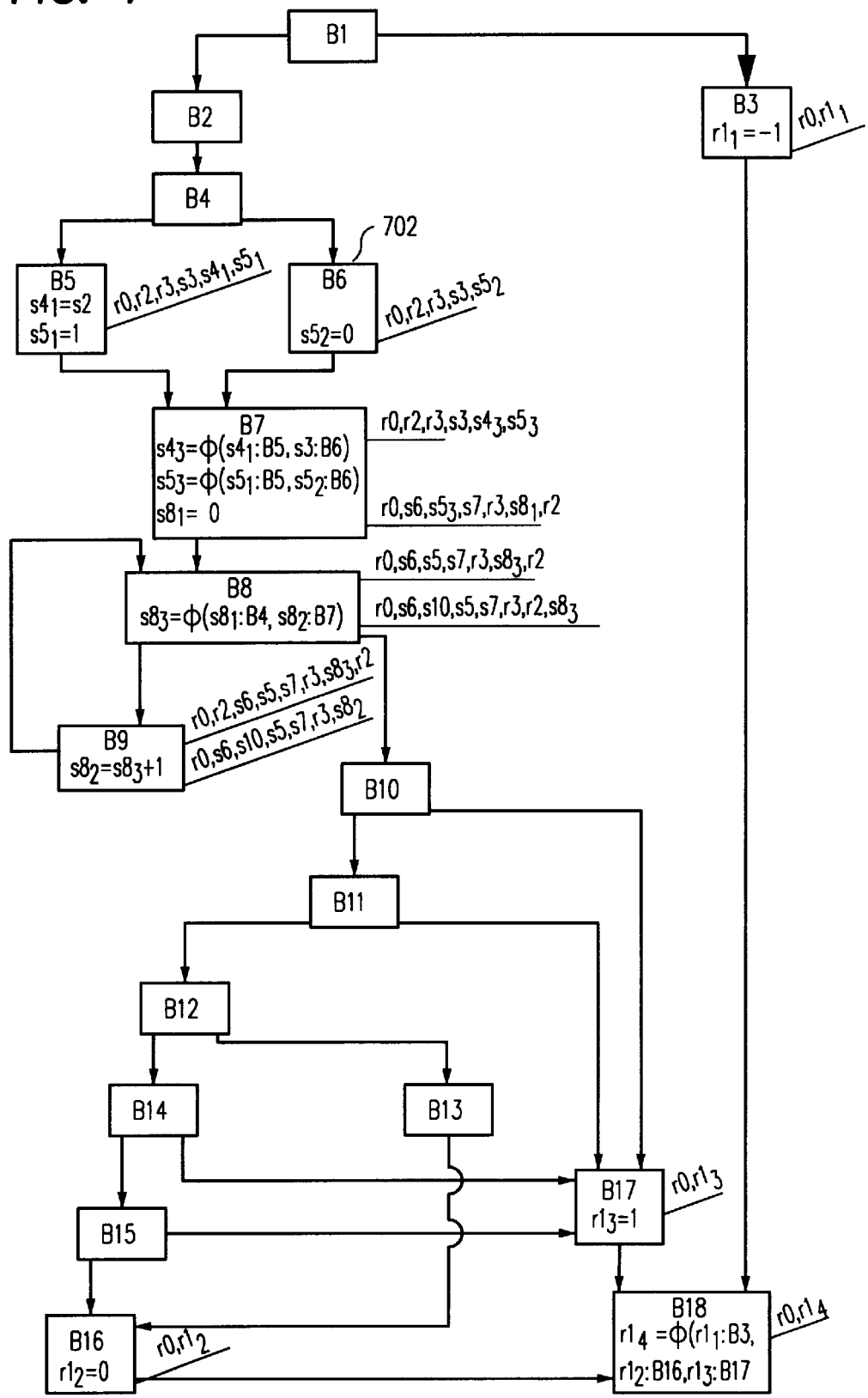
FIG. 7 shows the control flow diagram corresponding to an optimized SSA-form code version of the routine "skewed."

FIG. 7 shows the control flow diagram corresponding to the optimized SSA-form of the routine "skewed." Note that the elimination of the redundant copy instruction on line 13 of the non-optimized SSA-form of the routine "skewed" results in elimination of the assignment "s4₂=s3" from basic block B6 702.

Figure 8A:
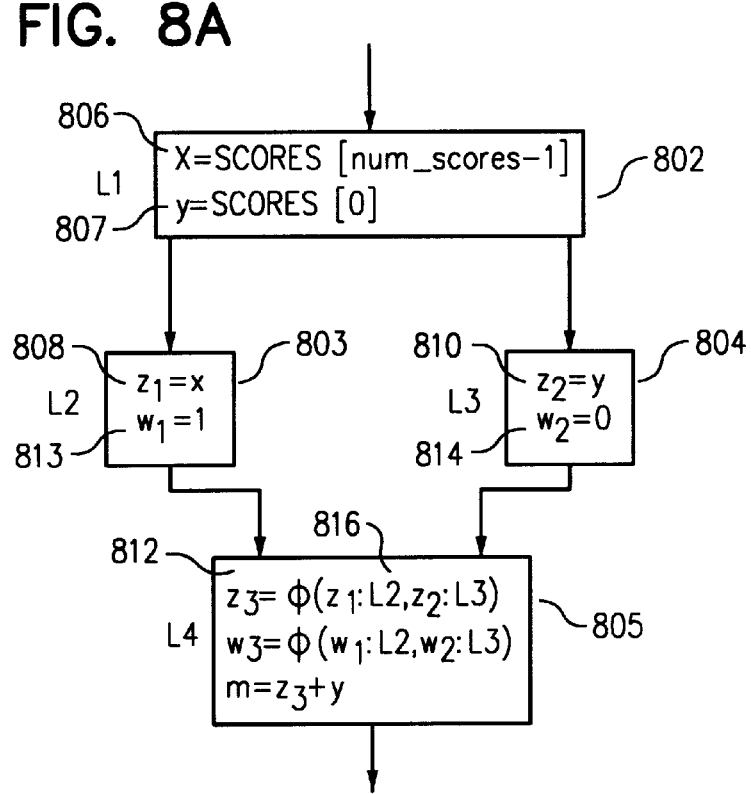
FIGS. 8A–B show a simplified representation of an optimization illustrated in FIG. 7.
Figure 8B:
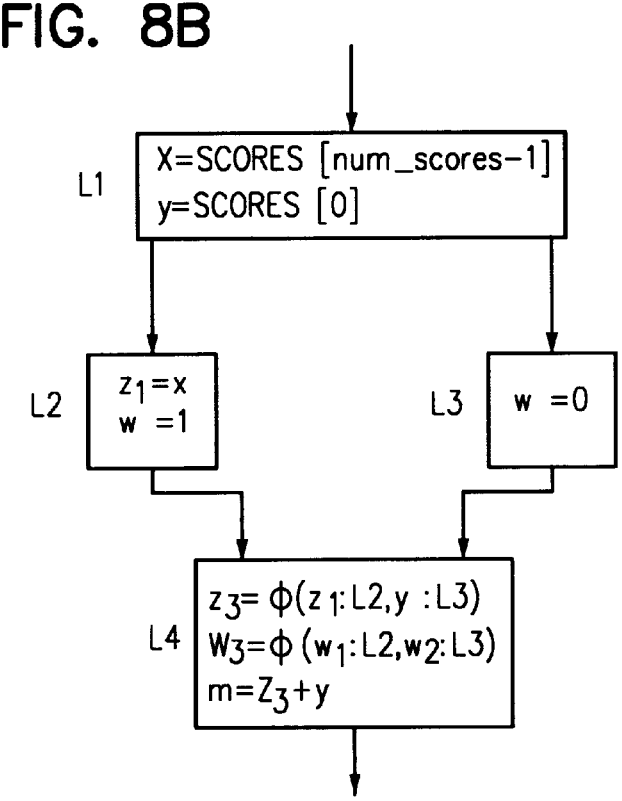

FIGS. 8A–B show a simplified representation of the optimization that eliminated the control flow branch, described above. FIG. 8A represents that portion of the control flow graph of FIG. 6 that includes basic blocks "B4," 608, "B5," 602, "B6" 604, and "B7" 606. In FIG. 8A, basic blocks "B4"–"B7" are renamed "L1"–"L4" 802–805. The virtual register "s2," defined on line 8 of the non-optimized SSA version of the routine "skewed," is represented in FIG. 8A as the variable "x" 806. The virtual register "s3" defined on line 9 of the non-optimized SSA version of the routine "skewed" is represented in FIG. 8A as the variable "y" 807. Subscripted virtual registers "s4₁" and "s4₂" are represented by variables "z₁" 808 and "z₂" 810, respectively. The subscripted virtual register "s4₃" is represented in FIG. 8A by the subscripted variable "z₃" 812. Subscripted variables "w₁" and "w₂" 812 and 814 in FIG. 8A represent subscripted virtual registers "s5₁" and "s5₂," respectively. Representations like the representation in FIG. 8A will be used in the subsequent discussion to abstractly represent subscripted variables and φ-instructions inserted into the basic block of a control flow graph corresponding to intermediate-code programs. FIG. 8B represents the same portion of FIG. 7 as that of FIG. 6 represented by FIG. 8A. Thus, FIGS. 8A and 8B abstractly represent the changes in the control flow graph arising from the elimination of the "mov" instruction on line 13 of the non-optimized SSA version of the routine "skewed."

Consider the φ-instruction 816 at the beginning of basic block "L4" 805 in FIG. 8A. The three variables "z₁," "z₂," and "z₃" that occur in the φ-instruction 816 are called "resources." The variable whose value is defined as a result of the φ-instruction, "z₃" is called a "target resource," or simply a "target." The variables "z₁" and "z₂" that are used in the body of the φ-instruction are called "source resources" or simply "sources." Source resources are paired in the φ-instruction with the label of the basic block that precedes the basic block containing the φ-instruction and from which the source resource reaches the basic block containing the φ-instruction. For example, source "z₁" is paired with the basic block label "L2" in the φ-instruction 816 to indicate that source "z₁" reaches the φ-instruction in basic block "L4" 805 via predecessor basic block "L2" 803. In the φ-instruction, a source and the associated basic block label are separated by a colon.

Figure 9A:
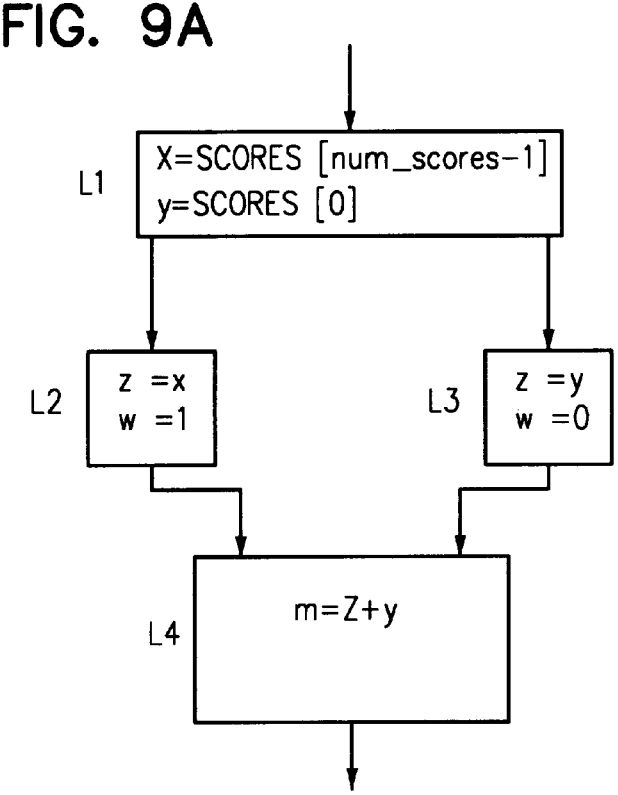
FIGS. 9A–B show the result of transforming the SSA-form code of FIGS. 8A–B back to non-SSA-form code.
Figure 9B:
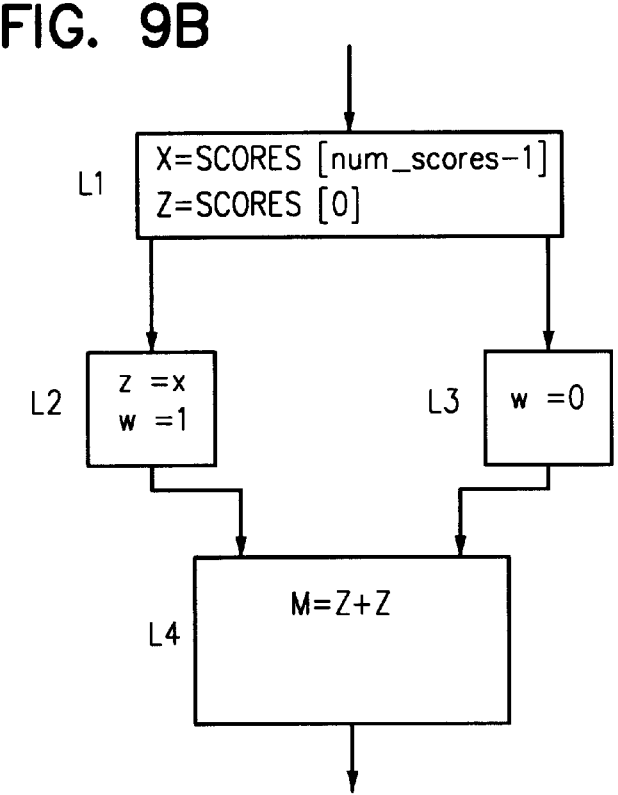

When a compiler is finished with those optimizations requiring SSA-form intermediate-level code, a compiler conducts a fairly mechanical transformation of SSA-form intermediate-level code back to non-SSA-form intermediate-level code. The mechanics of processing the subscripted variables and φ-instructions is straightforward. For each φ-instruction, all of the resources associated with the φ-instruction are replaced with a single variable and the φ-instruction is eliminated. FIGS. 9A–B show the result of transforming the SSA-form code of FIGS. 8A–B back to non-SSA-form code. In FIG. 9A, subscripted variables "z₁," "z₂," and "z₃" have all been replaced by the single variable "z," subscripted variables "w₁" and "w₂" have been replaced by the single variable "w," and the two φ-instructions at the beginning of basic block "L4" are removed. Thus, after transitioning back to non-SSA-form intermediate-level code, the variable "z" is assigned the value contained in variable "x" in basic block "L2" and is assigned the value contained in variable "y" in basic block "L3." The variable "z" then has the appropriate value when control flows to basic block "L4." The φ-instruction is thus not needed after the replacement of variables "z₁," "z₂," and "z₃" with the single variable "z."

However, consider FIG. 9B representing the optimized non-SSA-form intermediate-level code corresponding to the SSA-form code represented by FIG. 8B. The variables "y," "z₁," and "z₃" are both replaced by the single variable "z," the variables "w₁" and "w₂" are both replaced by the variable "w," and the two φ-instructions in basic block "L4" are removed. In this case, the variable "z" will first be assigned one value in basic block "L1" and then assigned a second value in basic block "L2." At the point where this second value is assigned to the variable "z" in basic block "L2," the first assigned value is lost. Because of the mechanical replacement of the variable "y" by the variable "z" in FIG. 9B, the addition instruction in basic block "L4" of FIG. 9B, "m=z+z," is semantically different from the addition instruction in basic block "L4" of FIG. 9A, "m=z+y." Thus, the semantics of the non-SSA-form of the optimized version of the intermediate-level code of FIG. 9B are different from the semantics of the optimized SSA-form intermediate-level code of FIG. 8B. The semantic meaning of the routine has changed and the final assembly-language or machine-code version of the routine produced by the compiler will not correspond semantically to the source-language version of the routine that defines the semantic behavior expected for the final assembly-language or machine-code version of the routine. It is this type of problem that the present invention is meant to correct. In the current case, the midpoint score calculated in the source-language version of the routine "skewed" by adding together the local variables "first" and "last" will be instead incorrectly calculated, following the semantically unfaithful transformation from optimized SSA-form code back to optimized non-SSA-form code, by adding the variable "first" to itself or by adding the variable "last" to itself.

In the next subsection, various different scenarios that prevent a semantically-faithful transition from optimized SSA-form intermediate-level code to optimized non-SSAform intermediate-level code are described with reference to diagrams similar to the diagrams shown in FIGS. 8A and 8B. The above detailed example, starting from a source-language routine, is presented to clearly describe the basic problem, to introduce SSA-form and the basic nomenclature used to describe φ-instructions, and to introduce the concept of the control flow graph and the interference graph. These concepts are vital to understanding the scenarios presented in the next subsection and the implementation of the present invention that will be presented in the subsection that follows the next subsection.

Types of Resource Interferences and Their Remedies

Figure 10A:
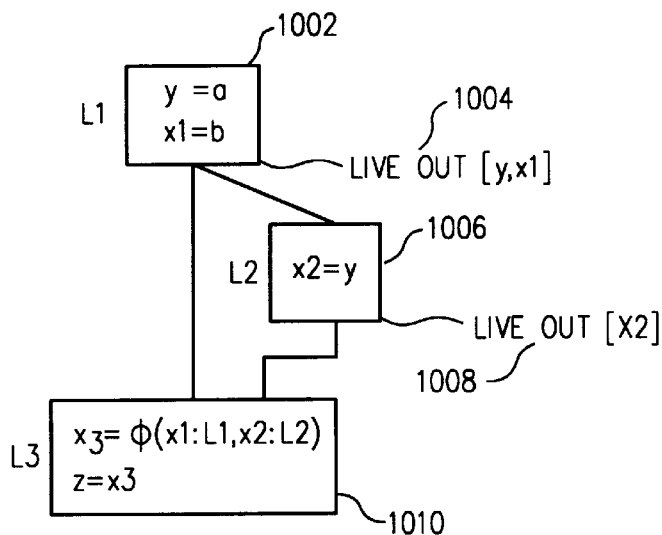
FIGS. 10A–C illustrate an asymmetric interference arising from copy elimination.
Figure 10B:
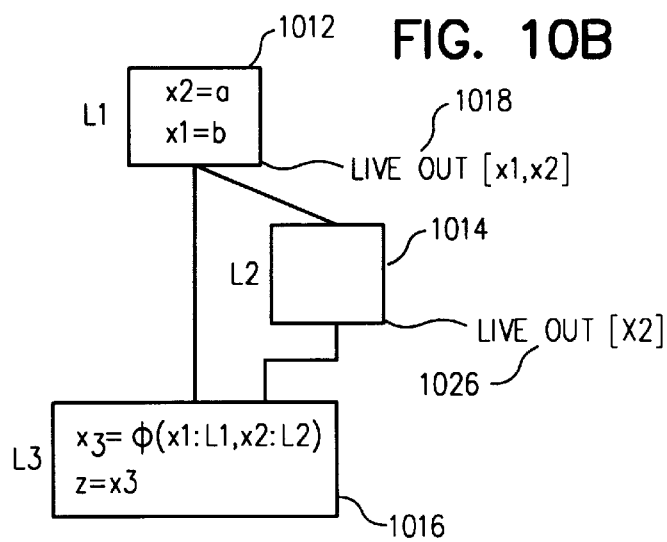
Figure 10C:
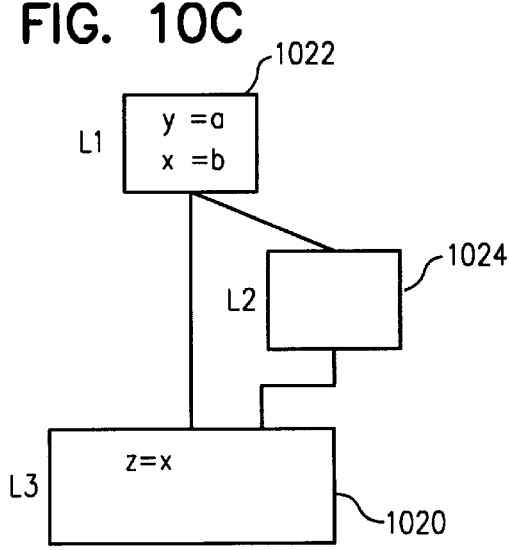

FIGS. 10A–C illustrate an asymmetric interference arising from copy elimination. FIG. 10A shows an abstract depiction of three basic blocks from a control flow graph for an SSA-form intermediate-level routine. This type of abstract depiction was introduced in the previous subsection. In basic block "L1" 1002, variable y is assigned the value α and variable x1 is assigned the value b. The LiveOut set 1004 for basic block L1 1004 includes both variables y and x1. In basic block L2 1006, the variable x2 is assigned the value contained in the variable y, i.e., the value α. The LiveOut set for basic block L2 1008 includes the variable x2. Finally, in basic block L3 1010, a φ-instruction assigns the variable x3 to either the value contained in variable x1 or the value contained in variable x2, depending on from which basic block control flowed to basic block L3, as discussed in the previous subsection. Then, the variable z in basic block L3 1010, is assigned the value contained in the variable x3. Essentially, z should end up with the value b if control flows from basic block L1 to basic block L3, and z should end up with the value a if control flowed from basic block L1 to basic block L2 and then to basic block L3.

FIG. 10B again displays basic blocks L1–L3 from FIG. 10A, but after an optimization phase that eliminates redundant copies, where the source and target do not interfere. The optimization phase eliminates the copy of the value in variable y into variable x2 in basic block L2, instead directly assigning the value a to variable x2 in basic block L1. The LiveOut set 1018 for basic block L1 in FIG. 10B has been accordingly updated to include variable x2 rather than variable y. The code represented by FIG. 10B is a semantically equivalent to the code represented by FIG. 10A. The φ-instruction will select the value stored either in variable x1 or in variable x2 to assign to variable x3, in basic block L3 1016, depending on whether control flows from basic block L1 1012 to basic block L3 1016 or from basic block L1 1012 to basic block L2 1014 and then to basic block L3 1016.

This interference is called asymmetric because the interfering sources are not equivalently represented in the LiveOut sets of the predecessor basic blocks. Variable x1 is in the LiveOut set of basic block L1 but not in the LiveOut set of basic block L2, while variable x2 is in the LiveOut sets of both basic blocks. In a symmetric interference, discussed below, either both interfering sources will occur in the LiveOut sets of both predecessor blocks, or neither interfering source will occur in the LiveOut sets of either predecessor basic block. To remove asymmetric interferences, a copy instruction needs to be placed in a specific predecessor basic block, whereas symmetric interferences may be removed by placing a copy instruction in either predecessor basic block, in some cases, and in both predecessor blocks, in other cases.

FIG. 10C represents the code represented by FIG. 10B following a transition from SSA-form back to non-SSA-form, as discussed in the previous subsection. In this transition, the φ-instruction in basic block L3 1016 of FIG. 10B is removed, and all resources associated with the φ-instruction are replaced by a single variable. Thus, in FIG. 10C, the variable x replaces the variables x1, x2, and x3 from FIG. 10B and the φ-instruction has been removed from basic block L3 1018. However, the code represented by FIG. 10C is not semantically equivalent to the code represented by FIG. 10B. Notice that x is first assigned the value α and then assigned the value b in basic block L1. At the end of basic block L1, x will have the value b, and the first assignment will be lost. Thus, the assignment of the value stored in x to the variable z, in basic block L3 1020, will result in z always receiving the value b, regardless of whether control flows from basic block L1 1022 to basic block L3 1020 or whether control flows from basic block L1 1022 to basic block L2 1024 and then to basic block L3 1020. This is an asymmetric interference because, referring to FIG. 10B, x1 is not in the LiveOut set 1026 of basic block L2 1014 but x2 is in the LiveOut set 1018 of basic block L1 1012.

Figure 11A:
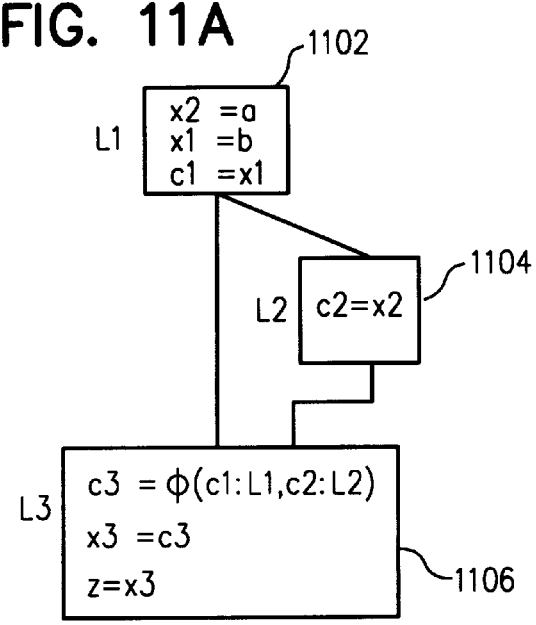
FIGS. 11A–B illustrate one solution to the asymmetric interference illustrated in FIG. 10.
Figure 11B:
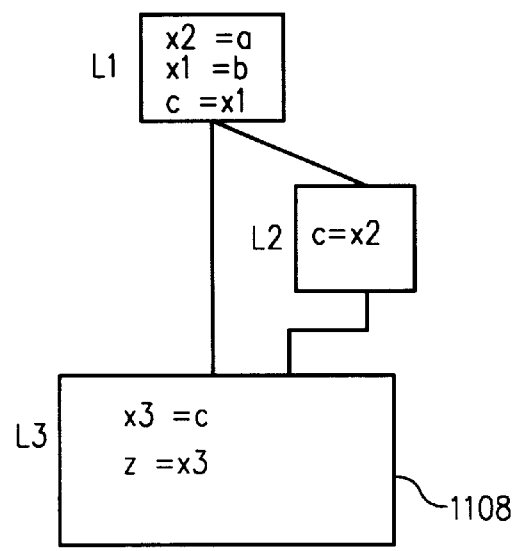

FIGS. 11A–B illustrate one solution to the asymmetric interference illustrated in FIG. 10. In FIG. 11A, three copy instructions c1=x1, c2=x2, and x3=c3 have been inserted into basic blocks L1 1102, L2 1104, and L3 1106, respectively. Thus, variables c1, c2, and c3 have been introduced to contain copies of the values stored in variables x1, x2, and x3, respectively. The φ-instruction uses the copy variables c1, c2, and c3 rather than variables x1, x2, and x3. Insertion of the copies has the effect of eliminating the interference between variables x1 and x2.

When the SSA-form code represented in FIG. 11A is transformed back to the non-SSA-form code of FIG. 11B, the semantics of the SSA-form code are preserved. Thus, when z is assigned the value contained in variable x3 in basic block L3 1108, z will be assigned either the value α or the value b, depending on whether execution reaches basic block L3 via basic block L1 or via basic blocks L1 and L2. Thus, the code in FIG. 11B is semantically equivalent to the code in FIGS. 10A–B. By insertion of copy instructions for each resource in the φ-instruction, all interferences between the resources of the φ-instruction are eliminated.

Figure 12A:
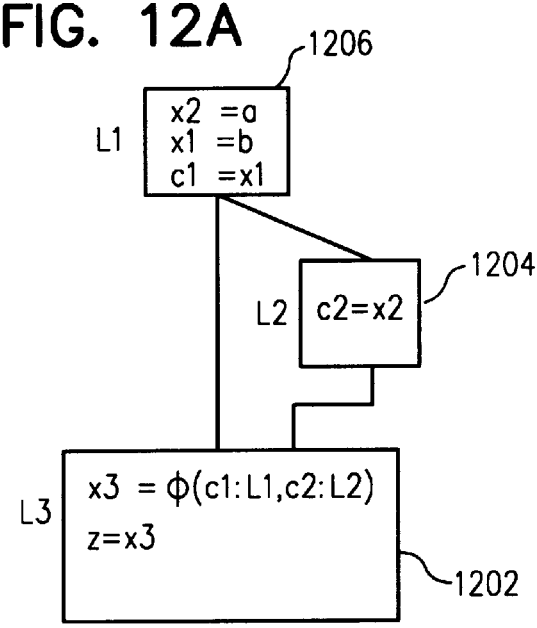
FIGS. 12A–B illustrate elimination of the interferences between the resources of the φ-instruction illustrated in FIGS. 11A–B by inserting less copy instructions than were inserted in FIG. 11B.
Figure 12B:
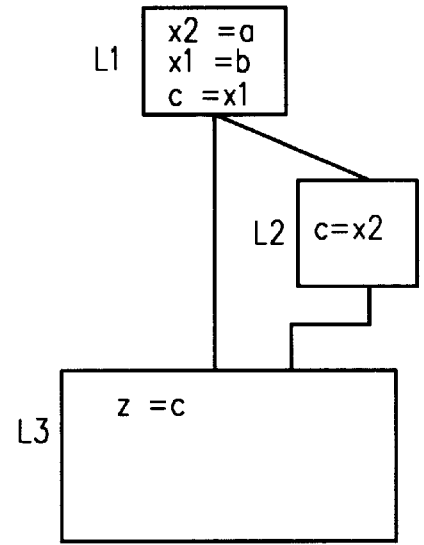

An important consideration for eliminating interferences by inserting copy instructions is whether a copy instruction needs to be inserted for each resource of a φ-instruction. If less copies can be inserted to eliminate all the interferences, then more efficient code will be obtained following the transition back to non-SSA-form. FIGS. 12A–B, similar to FIGS. 11A–B, illustrate elimination of the interferences between the resources of the φ-instruction by inserting less copies than were inserted in FIG. 11. The copy variable c3, used in basic block L3 1106 of FIG. 11A, is not used in basic block L3 1202 of FIG. 12A. However, as seen in FIG. 12B, elimination of the copy variable c3 and the copy instruction x3=c3 has not affected the semantics of the resulting non-SSA code represented in FIG. 12B. Thus, FIGS. 12A and 12B demonstrate that it is possible to eliminate all interferences between resources of a φ-instruction without adding copy variables for each resource of the φ-instruction.

Figure 13A:
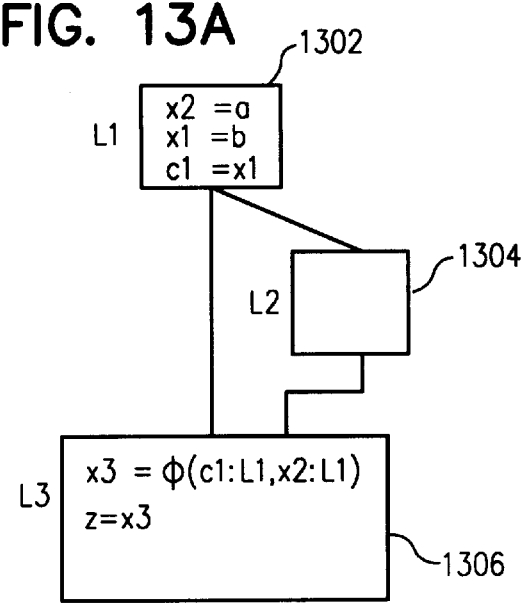
FIGS. 13A–B illustrate an attempt to eliminate φ-instruction interferences for the problem illustrated in FIG. 10 by inserting a single copy instruction.
Figure 13B:
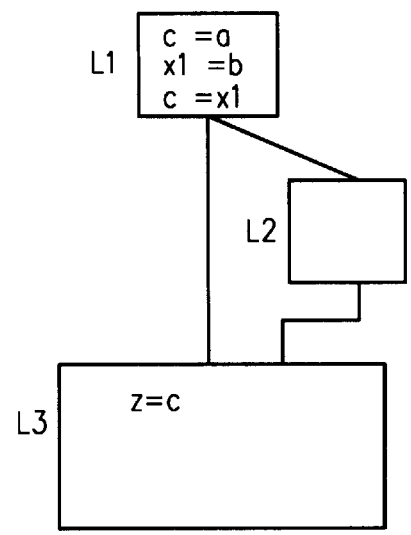

FIGS. 13A–B illustrate an attempt to eliminate φ-instruction interferences for the problem illustrated in FIG. 10 by inserting only a single copy instruction. In FIG. 13A, a single copy instruction c1=x1 has been inserted in basic block L1 1302, but no copy instruction has been inserted in basic block L2 1304, unlike in FIG. 12A, where the copy instruction c2=x2 is inserted into basic block L2 1204. Thus, the φ-instruction in basic block L3 1306 uses resources x3, c1, and x2. The semantics of the code represented by FIG. 13A is equivalent to the semantics of the original code represented in FIG. 10A. FIG. 13B represents the code represented by FIG. 13A following transition back to non-SSA-form. The variables of the φ-instruction in basic block L3 1306 in the SSA-form code are replaced in FIG. 13B by the variable c. Note, however, that the code represented by FIG. 13B is no longer semantically equivalent to the code represented by FIG. 13A, and is in fact equivalent to the code represented by FIG. 10C. Thus, insertion of only a single copy instruction into basic block L1 1302 is not sufficient to eliminate the interference between φ-instruction resources x1 and x2.

Figure 14A:
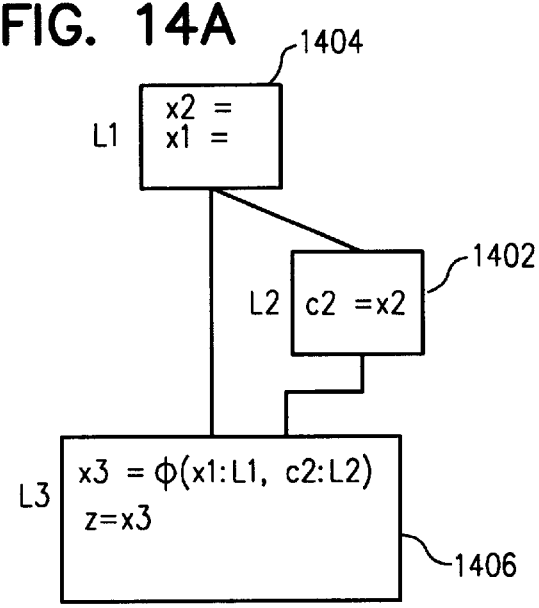
FIGS. 14A–B illustrate an attempt to eliminate the interference between φ-instruction resources by inserting a single copy instruction.
Figure 14B:
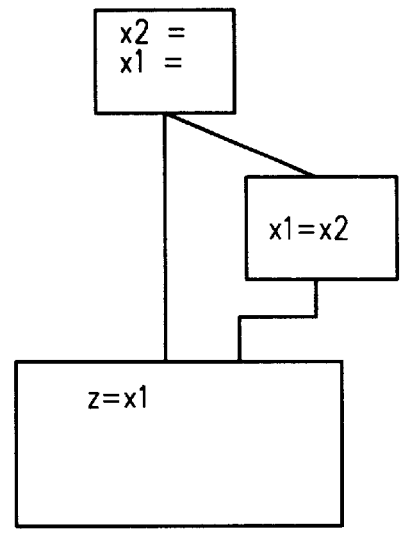

FIGS. 14A–B illustrate another attempt to eliminate the interference between φ-instruction resources by inserting a single copy instruction. In FIG. 14A, the copy instruction c2=x2 is inserted into basic block L2 1402, as in basic block L2 1204 of FIG. 12A, but the copy instruction c1=x1, inserted into basic block L1 1206 of FIG. 12, has not been inserted into basic block L1 1404 of FIG. 14A. Note that the φ-instruction in basic block L3 1406 uses resources x3, x1, and c2. FIG. 14B shows the transition from the SSA-form code of FIG. 14A back to a non-SSA-form code. All the resources of the φ-instruction, x3, x1 and c2, have been replaced in FIG. 14B by the variable x1. The code represented by FIG. 14B is semantically equivalent to the code represented by FIG. 14A as well as the original code represented in FIG. 10A. Thus, the single copy instruction c2=x2 inserted into basic block L2 1402, is sufficient to eliminate the interference between phi resources x1 and x2 of FIG. 10A. In the case of an asymmetric interference, as illustrated in FIG. 10B, a single copy instruction needs to be inserted into the basic block that provides the resource that is present in the LiveOut sets of both basic blocks preceding the basic block containing the φ-instruction. Thus, this type of asymmetric interference can be detected by noting, from an interference graph, that two resources associated with the φ-instruction interfere somewhere in the routine or program. The interference is eliminated by inserting a copy instruction into the basic block from which one of the interfering resources is received. In the case of the asymmetric interference discussed above, a copy instruction needs to be inserted into the basic block from which the interfering resource that appears in both LiveOut sets is received.

Figure 15A:
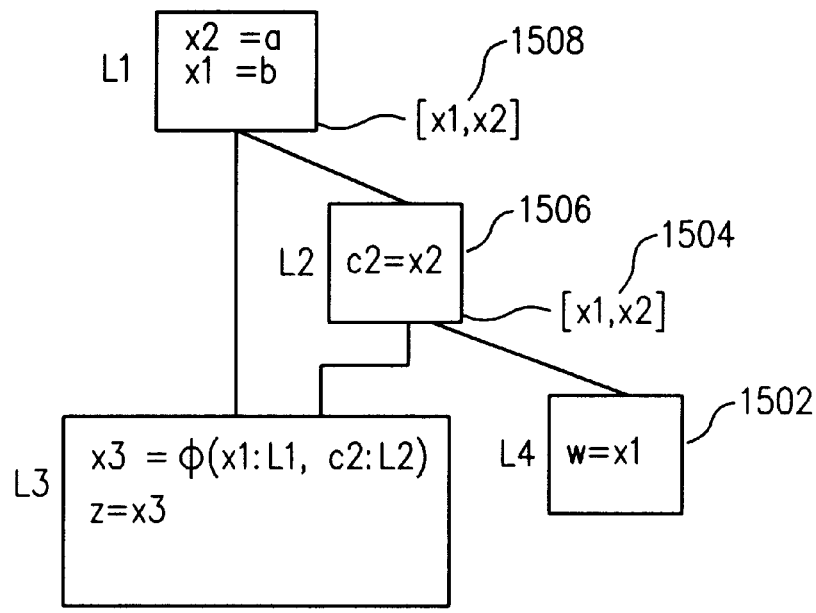
FIGS. 15A–B illustrate a symmetric interference related to the interference illustrated in FIGS. 10–14.
Figure 15B:
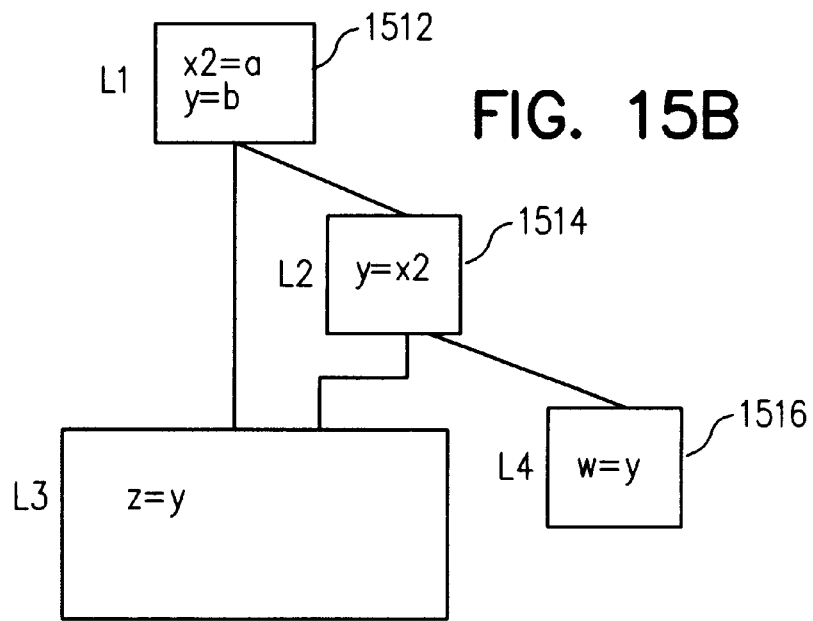

FIGS. 15A–B illustrate a symmetric interference closely related to the interference illustrated in FIGS. 10–14. In FIG. 15A, an additional basic block L4 1502 is included in the control flow graph extract. In basic block L4 1502, the variable w is assigned the value contained in the variable x1. The addition of basic block L4 has the effect of adding variable x1 to the LiveOut set 1504 associated with basic block L2 1506. Otherwise, the code in FIG. 15A is the same as the code in FIG. 14A. It should be noted that variables x1 and x2 originally interfered, and the copy c2=x2 has been introduced into basic block L2 1506 in order to attempt to eliminate that interference, just as in FIG. 14A. This is a symmetric interference because the original resource x2, replaced in FIG. 15A by the copy variable c2, appears in the LiveOut sets of both basic block L1 1508 and the LiveOut set of basic block L2 1504, and the resource x1 also appears in both LiveOut sets. The code represented by FIG. 15B is obtained by a transition back to non-SSA-form. Resources x3, x1, and c2 have all been replaced by the variable y. However, the code represented by FIG. 15B is not semantically equivalent to the code represented by FIG. 15A. In FIG. 15A, the variable w is assigned the value b if control flows from basic block L1 1508 through basic block L2 1506 to basic block L4 1502. However, in FIG. 15B, the variable w is assigned the value a if control flows from basic block L1 1512 through basic block L2 1514 to basic block L4 1516. This is because the variable y is assigned the value a by the assignment y=x2 in basic block L2 1514.

Figure 16A:
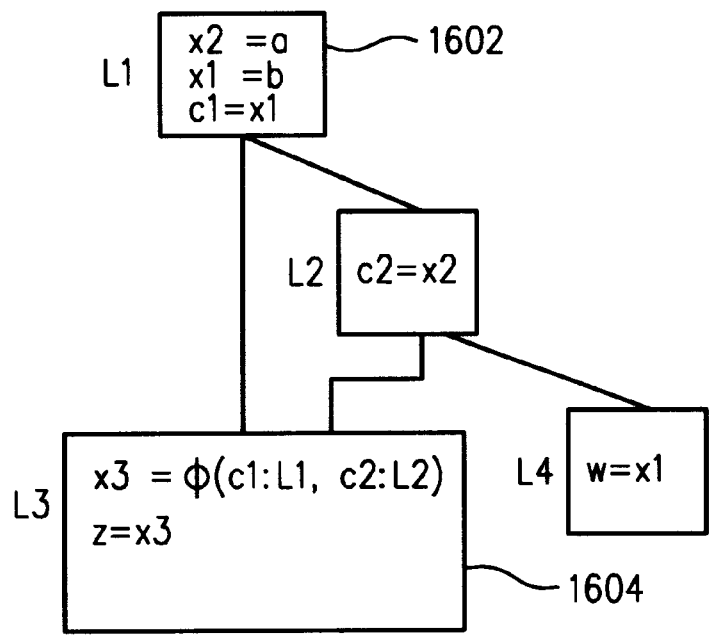
FIGS. 16A–B illustrate a solution to the interference illustrated in FIGS. 15A and 15B.
Figure 16B:
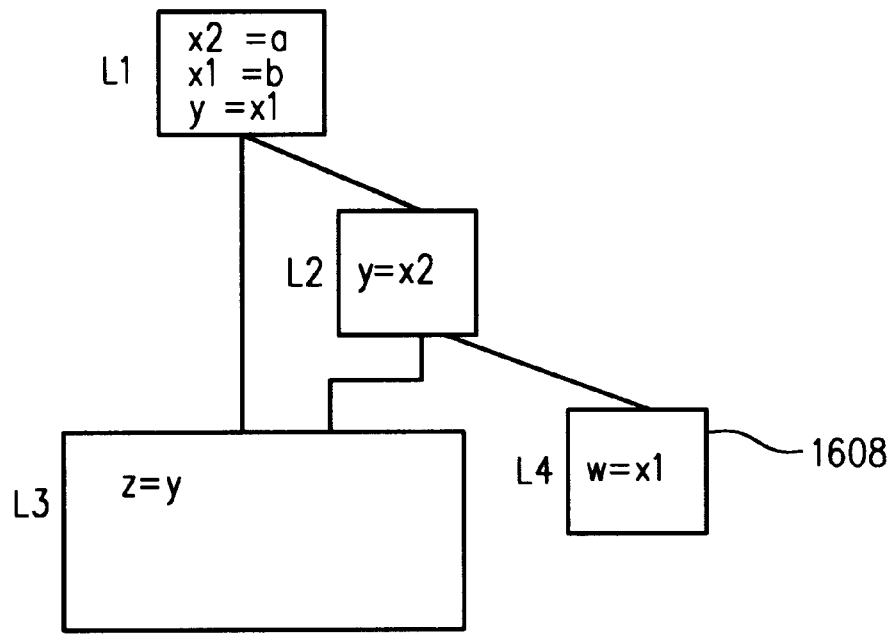

FIGS. 16A–B illustrate a solution to the problem illustrated in FIGS. 15A–B. In FIG. 16A, the copy instruction c1=x1 is inserted into basic block L1 1602. The φ-instruction in basic block L3 1604 has been updated to include resources x3, c1, and c2. FIG. 16B represents the code obtained by transitioning from the SSA-form code of FIG. 16A back to non-SSA-form. The resources x3, c1 and c2 in the φ-instruction in basic block L3 1604 are replaced by the variable y and the φ-instruction is removed. In the code represented by FIG. 16B, w is properly assigned the value α in basic block L4 1604 just as in basic block L4 1502 of the original code shown in FIG. 15A. Thus, in the case of a symmetric interference where the interfering resources both appear in the LiveOut sets of the basic blocks from which each resources arrives at the φ-instruction, copy instructions must be inserted into both of the basic blocks from which the interfering resources arrive at the φ-instruction.

Figure 17A:
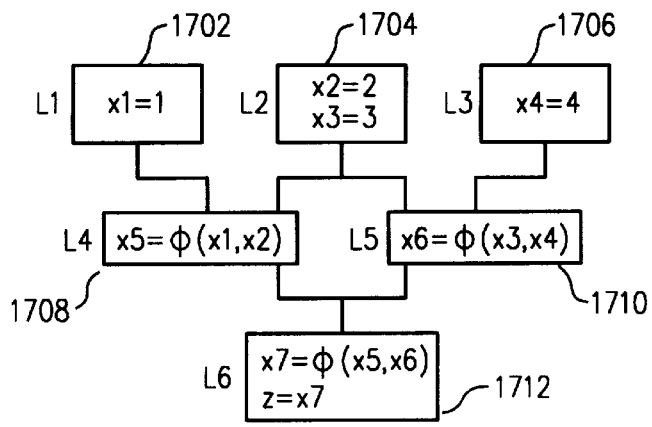
FIGS. 17A–D and 18A–E illustrate the concept of phi congruence classes and a second type of symmetric interference.

FIGS. 17A–D and 18A–E illustrate the concept of phi congruence classes as well as a second type of symmetric interference. FIG. 17A represents an SSA-form code extract that includes three φ-instructions. In basic block L1 1702, the variable x1 is assigned the value 1. In basic block L2 1704, variables x2 and x3 are assigned the values 2 and 3, respectively. In basic block L3 1706, variable x4 is assigned the value 4. In basic block L4 1708, a φ-instruction assigns to variable x5 either the value x1 or x2 depending on whether control flowed to basic block L4 from basic block L1 1502 or from basic block L2 1704. In basic block L5, a second φ-instruction assigns to variable x6 the value contained either in variable x3 or variable x4, depending on whether control flowed to basic block L5 1710 from basic block L2 1704 or from basic block L3 1706. Finally, in basic block L6 1712, a third φ-instruction assigns to variable x7 either the value contained in variable x5 or the value contained in variable x6, depending on whether control flowed to basic block L6 1712 from basic block L4 1708 or from basic block L5 1710. Thus, if control flows from basic block L1 1702 through basic block L4 1708 to basic block L6 1712, x7 will be assigned the value 1. If control flows to basic block L6 1712 from basic block L2 1704 through basic block L4 1708, x7 is assigned the value 2. If control flows from basic block L2 1704 through basic block L5 1710 to basic block L6 1712, x7 is assigned the value 3. Finally, if control flows from basic block L3 1706 to basic block L5 1710 to basic block L6 1712, x7 is assigned the value 4.

Figure 17B:
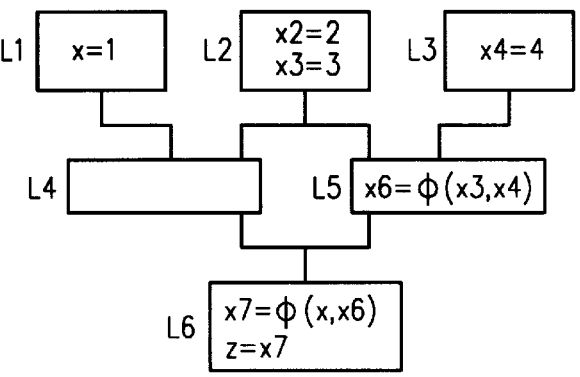
Figure 17C:
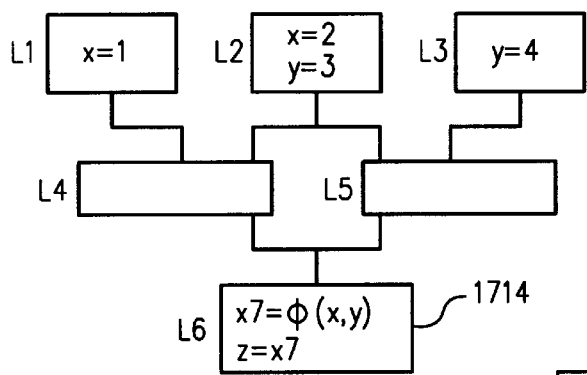
Figure 17D:
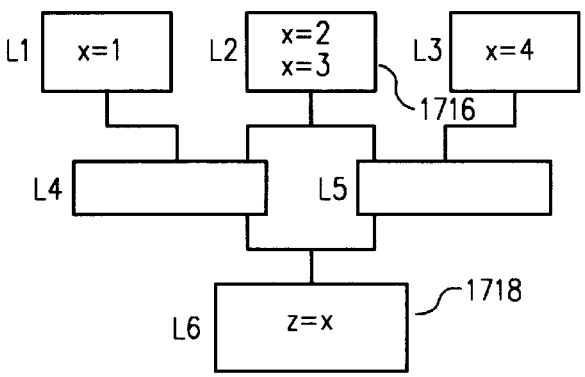

FIG. 17B illustrates the first step in transitioning from SSA-form back to non-SSA-form. In FIG. 17B, the first φ-instruction in basic block L4 1708 of FIG. 17A is eliminated, and the resources in that φ-instruction, x5, x1, and x2, are replaced by the variable x. These resources do not interfere with each other, and thus no interferences need to be eliminated. In FIG. 17C, the second φ-instruction in basic block L5 1710 of FIG. 17A is similarly eliminated, with the resources of the second φ-instruction replaced by the variable y. Note that the φ-instruction in basic block L6 1714 of FIG. 17C now contains the resources x7, x, and y as a result of the elimination of the first and second φ-instructions. Finally, in FIG. 17D, the final φ-instruction in basic block L6 1714 is eliminated and the resources associated with that φ-instruction are replaced by the variable x. FIG. 17D is thus the non-SSA-form code corresponding to the original SSA-form code in FIG. 17A. However, as can be seen from the multiple assignment statements in basic block L2 1716 of FIG. 17B, the semantics of the code represented by FIG. 17D are not equivalent to the semantics of the code represented by FIG. 17A. The first assignment in basic block L2 1716 x=2 is lost when the second assignment x=3 in basic block L2 1716 is executed. Thus, when z is assigned the value contained in variable x in basic block L6 1718, z can never acquire the value 2, whereas in FIG. 17A, z can acquire the value 2 when execution proceeds from basic block L2 1704 through basic block L4 to basic block L6 1712. Note that an interference is revealed only in FIG. 17C, after the first two φ-instructions have been eliminated. At this point, elimination of the interferences by placing only necessary copy instructions is not straightforward. In order to preserve the simple mechanical steps of converting SSA-form to non-SSA-form, it is necessary to recognize the interference in this example prior to the elimination of the φ-instruction in basic block L5 1710.

Figure 18A:
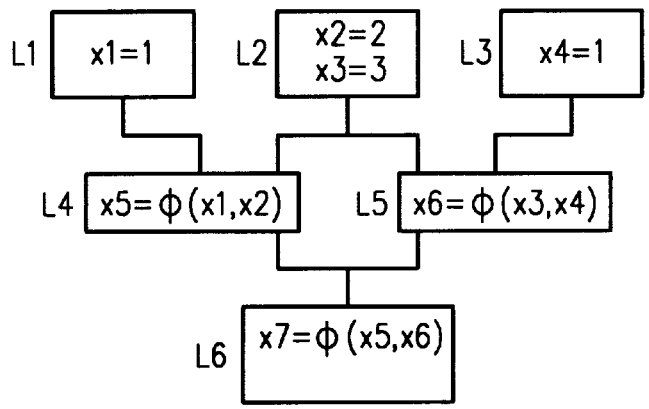
Figure 18B:
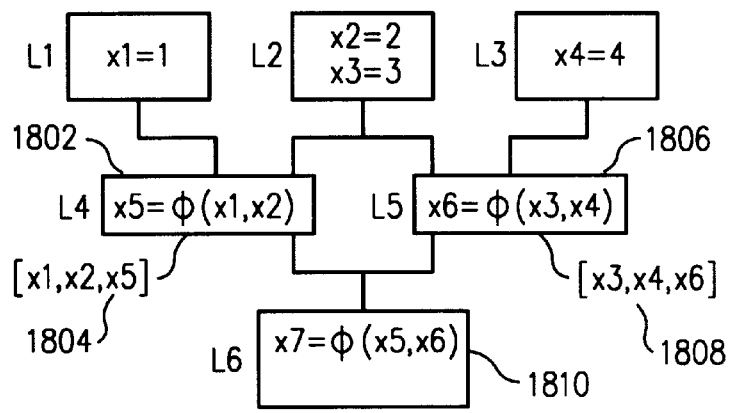
Figure 18C:
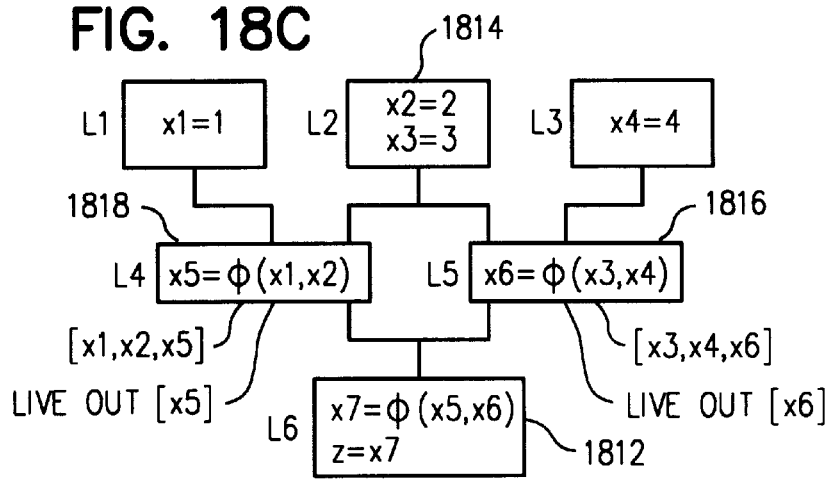
Figure 18D:
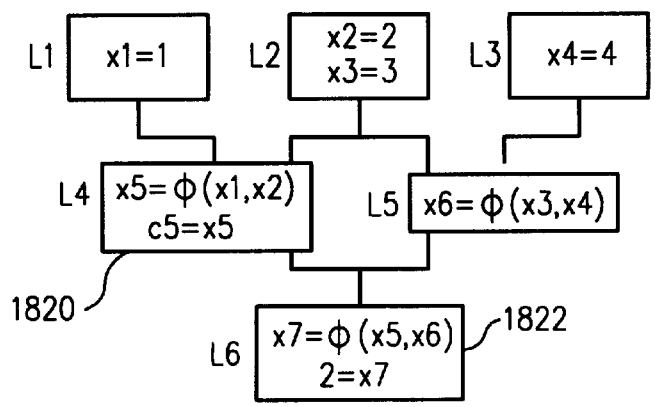
Figure 18E:
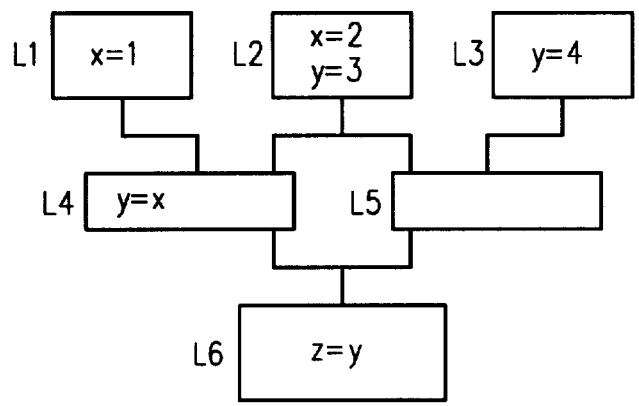

FIGS. 18A–E illustrate the concept of phi congruence classes. Phi congruence classes are useful in recognizing indirect interferences that will lead to direct interferences as φ-instructions are eliminated during the process of transitioning from SSA-form code to non-SSA-form code, as described above and illustrated in FIGS. 17A–D. FIG. 18A identically represents the same SSA-form code as represented in FIG. 17A. However, in FIG. 18B, phi congruence classes are introduced. For the φ-instruction in basic block L4 1802, the phi congruence class for each resource of the φ-instruction is identical and includes resources x1, x2 and x5 1104. Similarly, the phi congruence class for each resource of the φ-instruction in basic block L5 1106 includes resources x3, x4, and x6 1108. At the beginning of an analysis for φ-instruction interferences, the phi congruence class for each resource used in any φ-instruction within the SSA-form code is initialized to include only the resource itself. As the analysis proceeds, and a φ-instruction is analyzed for interferences, the phi congruence classes of all the resources associated with the φ-instruction are merged. Thus, in FIG. 18B, the two phi congruence classes 1104 and 1108 represent merging of the resources used in the first and second φ-instructions, respectively. In FIG. 18B, prior to consideration of the third φ-instruction in basic block L6 1110, the resources of the first φ-instruction in basic block L4 1102 do not interfere with each other, the resources associated with the second φ-instruction in basic block L5 1106 do not interfere with each other, and, more importantly, the phi congruence classes associated with each of the resources used in the φ-instruction in basic block L4 1102 do not contain resources that interfere with any of the resources used in the φ-instruction in basic block L5 1106. However, when the third φ-instruction in basic block L6 1112 is considered in FIG. 18C, the phi congruence classes associated with the resources x5 and x6 contain members that interfere. Specifically, the phi congruence class of resource x5 includes resource x2, and the phi congruence class of resource x6 contains resource x3. Variables x2 and x3 interfere in basic block L2 1114. Thus, although the two source resources of the final φ-instruction in basic block L6 1112, x5 and x6, do not directly interfere with one another, an indirect interference nevertheless exists between variables used in the final φ-instruction. By examining their respective phi congruence classes, it can be seen that these two source resources indirectly interfere through resources x2 and x3. At this point, a symmetric interference can therefore be detected between the source resources of the final φ-instruction in basic block L6 1112. In this case, the source resource x5 is not in the LiveOut set associated with basic block L5 1116 and the source resource x6 is not in the LiveOut set of basic block L4 1118. This is a different type of symmetric interference from the symmetric interference described in FIGS. 15A–16B, where both source resources were present in the LiveOut sets of the basic blocks through which they arrived at the φ-instruction. In the current type of symmetric interference, a copy instruction can be inserted in either basic block L4 1118 or basic block L5 1116, but only one copy instruction is needed. In FIG. 18D, a copy instruction has been inserted into basic block L4 1120 in order to eliminate the interference between sources x5 and x6 of the third φ-instruction in basic block L6 1122. FIG. 18E represents the non-SSA-form code resulting from a transition to non-SSA-form from the SSA-form code of FIG. 17D. The non-SSA-form code represented by FIG. 18E is semantically equivalent to the SSA-form represented by FIG. 18A. Thus, insertion of a single copy instruction is sufficient to eliminate the interference in order to allow a semantically-faithful transition from SSA-form back to non-SSA-form.

Figure 19A:
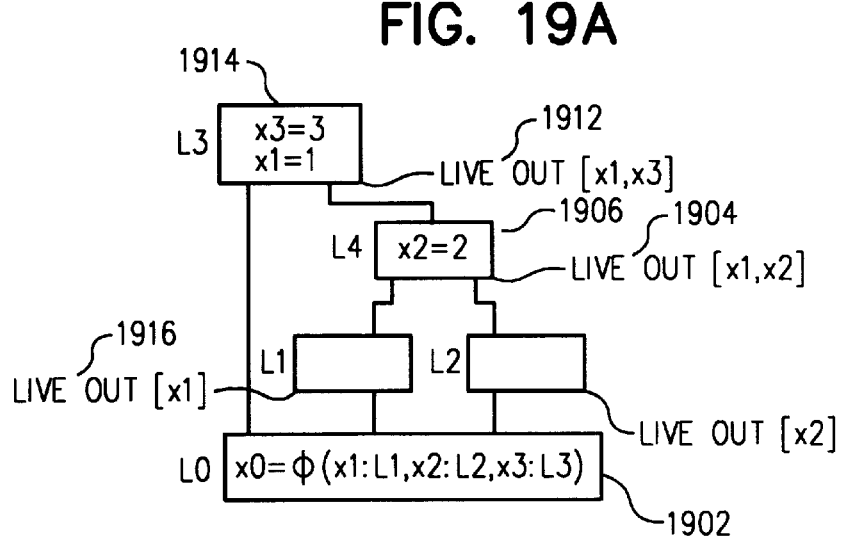
FIGS. 19A–D and 20A–D illustrate a final consideration involved in eliminating phi interferences by insertion of copy instructions.
Figure 19B:
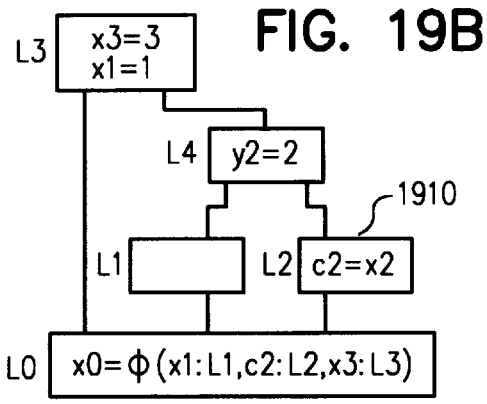
Figure 19C:
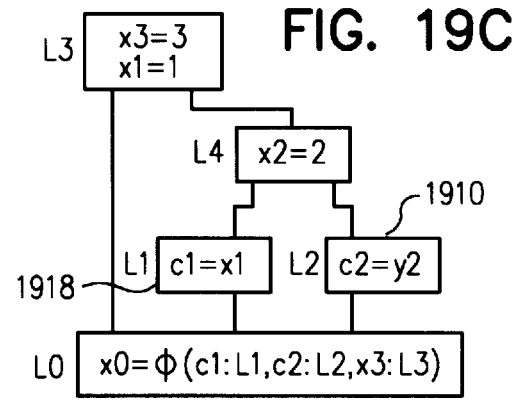
Figure 19D:
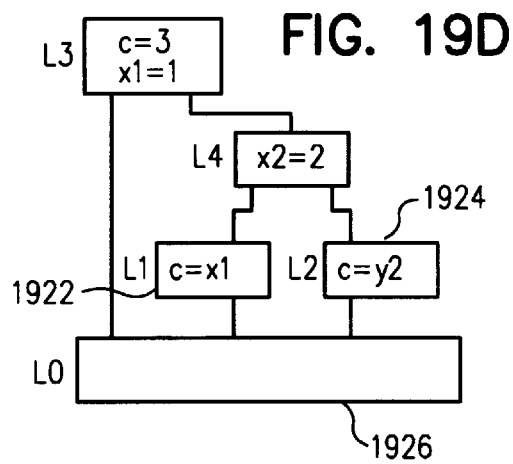
Figure 20A:
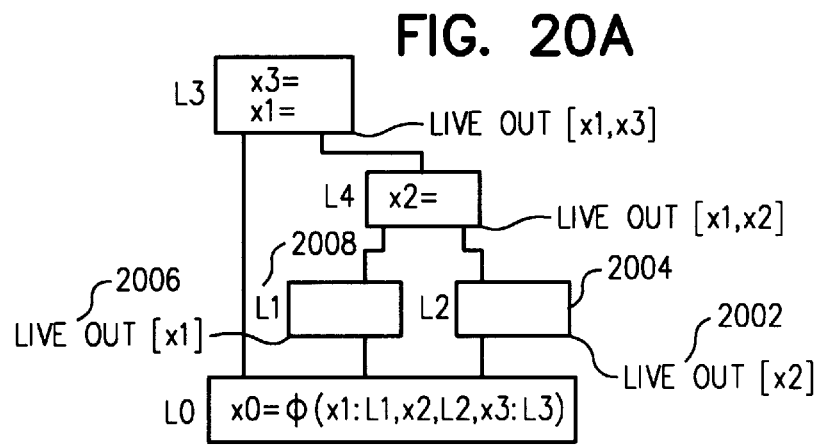
Figure 20B:
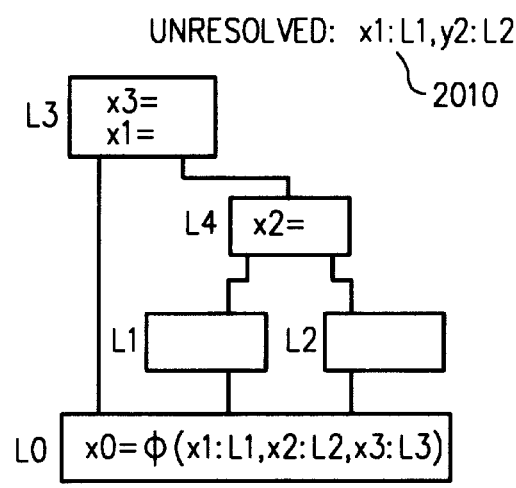
Figure 20C:
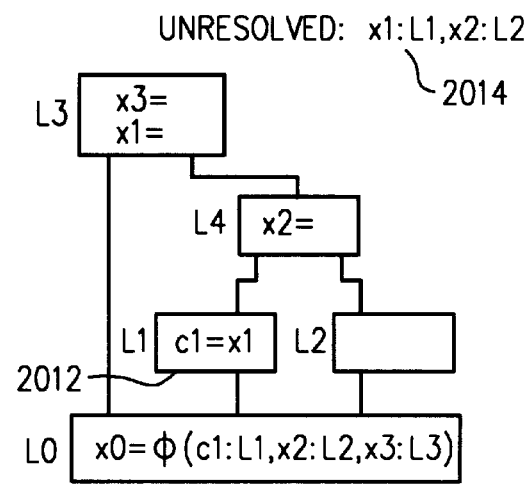
Figure 20D:
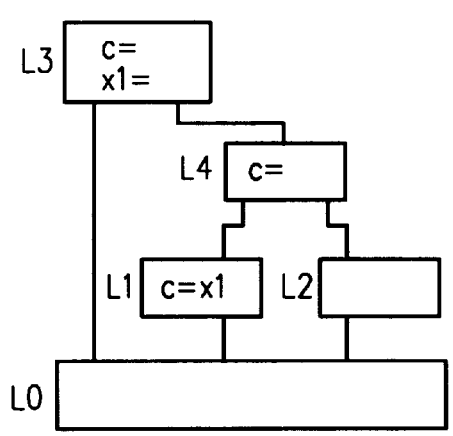

FIGS. 19A–D and 20A–D illustrate a final consideration involved in eliminating phi interferences by insertion of copy statements. FIG. 19A shows a representation of SSA-form intermediate-level code that includes a φ-instruction in basic block L0 1902. When analyzing the φ-instruction for resource interferences, the resources associated with the φ-instruction are generally considered two at a time. When the first two source resources, x1 and x2, are considered, it can be seen from the LiveOut set 1904 associated with basic block L4 1906 that the two resources x1 and x2 interfere. This is an asymmetric interference, similar to the asymmetric interference discussed in FIGS. 10–14, and can be eliminated by insertion of a single copy instruction in basic block L2. FIG. 19B shows the insertion of the copy instruction c2=x2 into basic block L2 1910. When sources x1 and x3 are considered, it can be seen from the LiveOut set 1912 associated with basic block L3 1914 that sources x1 and x3 interfere. This again is an asymmetric interference, as can be seen from examining the LiveOut sets 1912 associated with basic block L3 1914 and the LiveOut set 1916 associated with basic block L1. Thus, as described above, a single copy instruction may be inserted into basic block L1 1918 of FIG. 19C in order to eliminate the interference between sources x1 and x3. FIG. 19D shows the code resulting from transitioning from the SSA-form in FIG. 19C to non-SSA-form. Inspection of FIG. 19D reveals that the non-SSA-form code represented by FIG. 19D is semantically equivalent to the SSA-form code of FIG. 19A. However, inspection of FIG. 19D also reveals that the first copy instruction inserted, c=x2, is unnecessary. It redundantly copies the value contained in variable x2 which is still available via basic block L2 1924 at basic block L0 1926.

FIG. 20 illustrates a method to avoid insertion of the extra, redundant copy instruction inserted in FIG. 19B. In FIG. 20A, when the interference between the sources x1 and x2 is considered, it can be seen that the interference is a symmetric interference where x1 is not a member of the LiveOut set 2002 of basic block L2 2004 and source x2 is not a member of the LiveOut set 2006 of basic block L1 2008. This type of symmetric interference is that described above and illustrated in FIGS. 18A–E. In this type of symmetric interference, a copy instruction may be inserted either in basic block L1 2008 or basic block L2 2004. However, rather than insert a copy instruction straight away, the insertion is deferred by placing both source x1 and source x2, which interfere, into an unresolved resources list. FIG. 20B illustrates the deferring of the insertion of the copy instruction and the maintenance of the unresolved resources list 2010. In FIG. 20C, the interference between sources x1 and x3 is detected as an asymmetric interference, similar to the asymmetric interference described in FIGS. 10–14, and is eliminated by inserting a copy instruction c1=x1 into basic block L1 2012. Finally, when all interferences have been considered, the unresolved interferences represented by the resources in the unresolved resources list 2014 are considered. In this case, because the insertion of the copy instruction c=x1 in basic block L1, the previously noted interference between sources x1 and x2 have been removed. Thus, the SSA-form code represented by FIG. 20C contains no phi interferences. FIG. 20D shows the result of transitioning from the SSA-form code represented by FIG. 20C to non-SSA-form code. As can be seen by comparing FIG. 20D and FIG. 20A, the non-SSA-form code represented by FIG. 20D is semantically equivalent to the SSA-form code represented by FIG. 20A.

In the previous subsection, SSA-form intermediate-level code, φ-instructions, interference graphs, basic blocks, and control flow graphs where introduced. In this subsection, phi congruence classes, asymmetric and symmetric interferences, unresolved interference lists, and techniques for eliminating both asymmetric and symmetric interferences by the insertion of copy instructions have been introduced. Together, these concepts provide both a necessary and sufficient basis for describing an implementation of the method of the present invention for eliminating φ-instructions presented in the following subsection.

Implementation of a Method for Eliminating φ-Instructions and the Transition from SSA-form Back to Non-SSA-form Code In this subsection, a C++-like pseudo-code implementation of the method of the present invention for detecting and eliminating φ-instruction interferences will be presented. The pseudo-code implementation is presented to clearly describe a preferred embodiment of the present invention. However, the present invention can be implemented in any number of different computer languages in any number of different ways. Different types of data structures can be employed and different types of algorithms for the various components of implementation may be devised. An implementation may be written using different numbers of component routines and the sequence of execution of certain tasks represented by these routines may differ from implementation to implementation. Because the method for eliminating interferences and φ-instructions of the present invention will generally be implemented within an optimizing compiler, many implementation details will necessarily depend on the various design choices made in implementing the optimizing compiler.

In this subsection, a number of basic types and classes will first be described and certain basic data structures used in the implementation will be both described and illustrated. Next, a number of component routines will be described, finally followed by a description of the two main routines that implement the method of the present invention. A top-down approach to reading the pseudo-code implementation can be achieved by first reading the pseudo-code routine "eliminatePhiResourceInterferences" and proceeding backward through the remaining routines.

The following class and template definitions describe six basic types used in the pseudo-code implementation.

```
1   class variable;
2   class instruction;
3   class block;
4
5   class resource
6   {
7       variable var();
8       block block();
9       Bool source();
10      void setSource();
11      void setTarget();
12      Bool resolved();
13      Bool setResolved();
14      Bool setUnResolved();
15  }
16
17  template<class E> class set
18  {
19      set();
20      int numElements();
21      int add(const E& newElement);
22      int delete(const E& element);
23      E& operator [] (int i);
24      Bool    intersect(set<E>* intrset);
25      E& operator = (const& set<E>);
26      E& operator += (const& set<E>);
27      Bool in(const E& element);
28  }
29
30  class phiInstruction:instruction
31  {
32      set<resource>* getResources();
33      set<block>* getBlks(const resource& res);
34      void substitute (const resource& res, resource* newRes);
35  }
```

The class "variable," declared above on line 1, describes a single instance of a register or virtual register within an intermediate-level code routine or program. Similarly, the class "instruction," declared above on line 2, represents an instruction within an intermediate-level code routine or program. The class "block," declared above on line 3, represents a single basic block within a control flow diagram. Implementations or methods for these classes are not shown above because they are not needed in the pseudo-code implementation to be described below. These classes may be derived from character strings or implemented as more elaborate user-defined types.

Figure 21A:
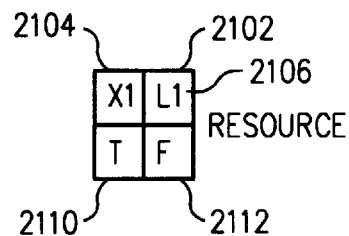
FIGS. 21A–E illustrate instances of classes used in the pseudo-code implementation of the present invention.

The class "resource," declared above on lines 5–15, represents a single resource used within a φ-instruction. A diagram of the data structure represented by the class "resource" is shown in FIG. 21A. A φ-instruction resource comprises a variable and basic block pair, as described above in previous subsections. Thus, the method "var( )," declared on line 7, returns the variable part of the resource, and the method "block( )," declared on line 8, returns the basic block portion of the resource. The representative instance of the class "resource" 2102 in FIG. 21A contains the variable "x1" 2104 and the basic block "L1" 2106. The class "resource" also contains two Boolean members. The first Boolean member indicates whether the resource is a source or a target within a φ-instruction. A resource may be used as both a target and a source in multiple φ-instructions within a routine or program, but the purpose of the member described above is confined to describing whether a particular resource is a target or source for a particular φ-instruction. This Boolean member is indicated in FIG. 21A as containing the value TRUE 2110. The member function "source( )," declared on line 9, returns a Boolean value indicating whether the resource is a source. The member "setSource( )," declared on line 10, sets the Boolean member that indicates whether the resource is a source or target to TRUE, and the member "setTarget( )," declared on line 11, sets the Boolean member to FALSE. The second Boolean member, shown in FIG. 21A as containing the Boolean value FALSE 2112, indicates whether a resource located on an unresolved resources list, described in the previous subsection, has been resolved since being placed in the unresolved resources list, or remains unresolved. The member "resolved( )," declared on line 12, returns a Boolean value indicating whether the resource has been resolved. The two members "setResolved( )" and "setUnResolved( )," declared on lines 13 and 14, respectively, set the member indicating whether the resource has been resolved to TRUE and FALSE, respectively.

The template class "set," declared on lines 17–28, is a general implementation of a set containing various types of elements. The bracketed declaration "<class E>" on line 17 is a place holder within the template for the class type of the elements stored in any particular type of set. Thus, this template class can be used as a prototype set type for declaring particular types of sets that contain particular types of elements. The member functions of the template class set include: (1) "set," a constructor that initializes the set to contain no elements; (2) "numElements," a member that returns the number of elements currently in the set; (3) "add," a member that adds a new element to the set; (4) "delete," a member that deletes an element from the set; (5) an operator overload of the array index operator so that each element in the set can be indexed by integer values just as an array is indexed; (6) "intersect," a member that returns a Boolean value indicating whether any member of the set pointed to by the set pointer "intrset," provided as an argument, is also a member of the set; (7) an operator overload of the assignment operator, so that one set can be assigned to another; (8) an operator overload of the add and assign operator, so that a set can be assigned to the union of the set and a set provided as the r- value of the add and assign operator; (9) "in," a member that returns a Boolean value to indicate whether the element supplied as an argument occurs in the set; and (10) "reset," a member that cleans all elements from the set so that the set is empty.

Figure 21B:
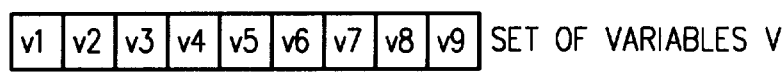

FIG. 21B shows a simple representation of a set of variables. This particular set contains the nine variables "v1"–"v9." With reference to this particular set, the assignment variable x=v[3]

will assign the value "v4" to the variable x, where indexing begins with element 0 according to C and C++ semantics. A set is not an array of a fixed number of elements, because the "add" and "delete" methods declared on lines 21 and 22 allow the number of elements within the set to be changed.

Figure 21C:
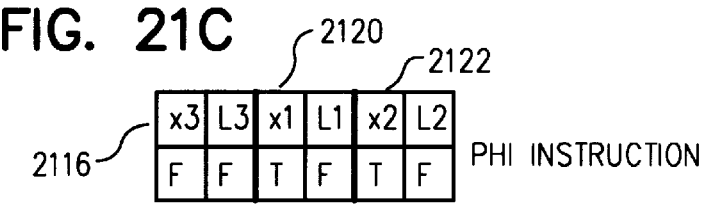

The class "phiInstruction," declared on lines 30–35, is a derivation of the base class "instruction," declared on line 2, that describes an SSA-form φ-instruction. FIG. 21C diagrammatically shows the memory layout of an instance of the φ-instruction class describing the φ-instruction "x3=φ (x1:L1,x2:L2)." The φ-instruction is described as a sequence of three resources 2116, 2120, and 2122. The first resource 2116 is the target resource and the two source resources 2120 and 2122, respectively, follow the target resource in the memory layout for the instance of the φ-instruction. The function members of the class "phiInstruction" include: (1) "getResources," which returns the set of resources associated with the φ-instruction; (2) "getBlks," a member that returns the set of basic blocks associated with the variable of a particular resource, supplied as argument "res," within the φ-instruction; and (3) "substitute," a member that substitutes a resource pointed by the resource source pointer "newRes" for the resource "res" currently associated with the φ-instruction.

Five additional classes used in the implementation of the preferred embodiment of the present invention are shown below:

```
1   class variableMap
2   {
3       int numElements();
4       int add(const& variable v);
5       int delete(const& variable v);
6       set<variable>& operator[] (int i);
7       void removeElementsWithSingletonSets();
8   }
9
10  class resourceMap
11  {
12      int numElements();
13      int add(resource *res);
14      int delete(resource *res);
15      set<*resource>& operator[] (int i);
16      resource* getUnresolvedResourceWithMaxUnresolved
                Neighbors();
17      resource* getUnresolvedResourceWithOnlyResolved
                Neighbors();
18  }
19
20  class instructionStream
21  {
22      set<resource>* getUniquePhiResources();
23      resource* insertResourceCopy (block blk, const resource& x);
24  }
25
26  class controlFlowGraph
27  {
28      instruction* getFirstPhi();
29      instruction* getNextPhi();
30      set<variable>* liveSet(const resource& res);
31      void update(block blk, resource* newRes, const resource&
                oldRes,
32                  instructionStream&istrm);
33  }
34
35  class interferenceGraph
36  {
37      Bool interfere(const set<variable>& var1,
                const set<variable>& var2);
38      Bool interfere(variable var1, const set<variable>& var2);
39      void add(variable v);
40      void addEdge(variable v1, variable v2);
41  }
```

Figure 21D:
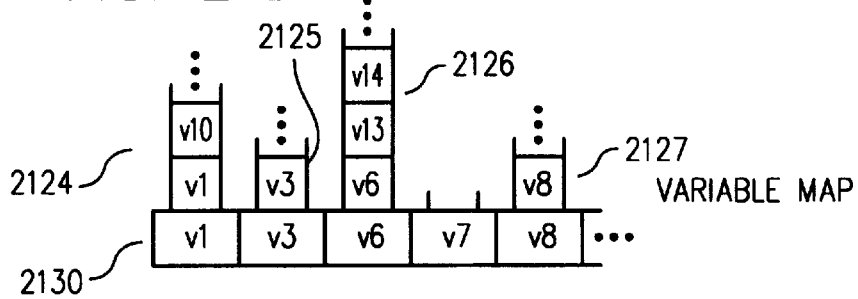

The class "variableMap," declared above on lines 1–8, is essentially a set of sets of variables. A diagram of an instance of the class "variableMap" is shown in FIG. 21D. The sets of variables contained in the variableMap are shown as vertical array-like columns 2124–2127. Each set of variables is associated with, and indexed by, a variable. These indexing variables are shown in the horizontal array-like structure 2130. The variableMap includes the methods: (1) "numElements," a method that returns the number of indexing variables within the variableMap; (2) "add," a method that adds an indexing variable to the variableMap; (3) "delete," a method that deletes an indexing variable, and any set of variables associated with that indexing variable, from the variableMap; (4) an operator overload of the array indexing operator that allows the sets of variables within the variableMap to be indexed by an indexing variable supplied as an argument; and (5) "removeElements WithSingletonSets," a member that removes all variables from the sets of variables that have only a single member. Thus, for example, invocation of this member on the example variableMap of FIG. 21D would remove the variables "v3" and "v8" from the sets of variables associated with these indexing variables.

Figure 21E:
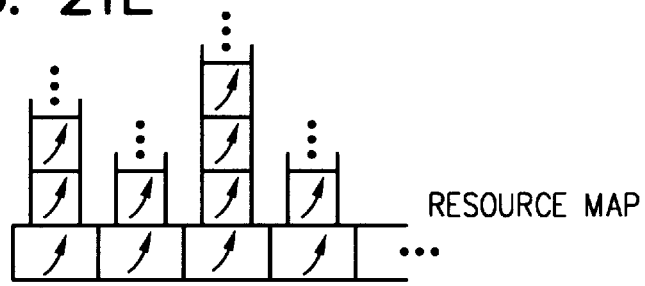

The class "resourceMap," declared above on lines 10–18, is analogous to the class "variableMap," described above, except that pointers to resources, rather than variables, compose both the indices and the sets stored within the resourceMap. An example instance of a resourceMap is shown in FIG. 21E. The first four methods of the resourceMap are entirely analogous to the first four methods of the variableMap, and will not be described further. The resourceMap data structure is used primarily for implementation of the unresolved resource lists, described above. There is an unresolved neighbor resource pointer set associated with each indexing resource. Thus, indexing into the resourceMap with a particular resource pointer returns a set that includes resource pointers that reference all unresolved neighbors associated with that resource. The resourceMap member "getUnresolvedResourceWithMaxUnresolved Neighbors," declared above on line 16, returns a pointer to the indexing resource pointer associated with the largest set of resource pointers within the resourceMap. The resourceMap member "getUnresolvedResourceWithOnly ResolvedNeighbors," declared above on line 17, returns an indexing resource pointer associated with a resource pointer set in which all the referenced resources are resolved.

The class "instructionStream," declared above on lines 20–24, represents the stream of instructions that compose an SSA-form routine or program that is analyzed by the preferred embodiment of the present invention for φ-instruction interferences. The member function "getUnique PhiResources," declared on line 22, returns a set containing all the resources that are associated with any φ-instruction within the routine or program represented by instructionStream. The member function "insertResourceCopy," declared on line 23, inserts a copy instruction into instructionStream in order to eliminate a phi interference, as described in the previous subsection. If the resource supplied as argument "x" is the source resource, then the copy instruction is inserted at the end of the basic block supplied as argument "blk." Otherwise, the copy instruction is inserted at the beginning of the basic block supplied as argument "blk." It is assumed that the member function "insertResourceCopy" has a way of generating a new resource as the target of the copy instruction, and returns a pointer to that new resource. The new resource pointed to by the return value of insertResourceCopy takes on the value of the source member of the resource supplied as argument "x."

The class "controlFlowGraph," declared on lines 26–32, implements a control flow graph like the control flow graph illustrated in FIGS. 1–4. The method "getFirstPhi" returns the first φ-instruction within the control flow graph. This φ-instruction is first with respect to some arbitrary traversal order of the control flow graph. The member function "getNextPhi" returns the next φ-instruction in the control glow graph following the φ-instruction returned by the last invocation of either getFirstPhi or getNextPhi. The member function "liveSet," declared on line 30, returns the set of variables that represent the LiveOut set of the basic block associated with the resource "res," supplied as an argument to liveSet, if the resource "res" is a source, and returns the set of variables that represent the LiveIn set for the basic block associated with the resource "res" if the resource "res" is a target. The member function "update," declared on line 31, updates the control flow graph to reflect the addition of a copy instruction into the instruction stream by the instructionStream method "insertResourceCopy." The arguments essentially identify the copy instruction that was inserted for which the control flow graph needs to be updated. If the new resource is a source of a φ-instruction, then update adds the new resource to the LiveOut set for the basic block in which the copy instruction was added. In this case, if the resource that is the source of the copy instruction is not in the LiveIn set for this basic block, and is not used in any φ-instructions in any predecessor basic blocks that are associated with this basic block, then the resource that is the source of the inserted copy instruction is removed from the LiveOut set of the basic block into which the copy instruction was inserted. If the resource that is the target of the inserted copy instruction is a target in the subsequent φ-instruction for which the copy instruction was inserted, then the resource that is the target of the inserted copy instruction is inserted into the LiveIn set of the basic block into which the copy instruction is inserted and the resource that is the source for the inserted copy instruction is deleted from the LiveIn set of the basic block into which the copy instruction was inserted. Thus, the method "update," updates the LiveIn and LiveOut sets of the basic blocks of the control flow graph to reflect the insertion of a copy instruction.

The class "interferenceGraph," declared above on line 35–41, implements an intereference graph, like the interference graph displayed in FIG. 5. The method "interfere," declared above on line 37, returns a Boolean value indicating whether any variable in the variable set "var1" interferes with any variable in the variable set "var2." The member "interfere," declared on line 38, returns a Boolean value indicating whether the variable "var1" interferes with any variable in the variable set "var2." The member function "add," declared on line 39, adds the variable to the interference graph, setting all the values in the columns and rows associated with the newly added variable to FALSE. The member function "addEdge," declared on line 40, sets the interference graph cell associated with variable "v1" and variable "v2" to the value TRUE, indicating an interference between the two variables.

The routine "handleInterferences" follows below:

```
1  void handleInterference (const variableMap& phiCongruence, const
2                          controlFlowGraph& CFG, const set<resource>& insRes,
3                          set<resource>& candidateResources, resourceMap&
4                          unresolvedNeighborMap, int i, int j)
5  {
6    if (phiCongruence[insRes[i].var()].intersect(CFG.liveSet(insRes[j]) &&
7       !phiCongruence[insRes[j].var()].intersect(CFG.liveSet(insRes[i]))
8    {
9          candidateResources.add(insRes[i]);
10   }
11   else if (phiCongruence[insRes[j].var()].intersect(CFG.liveSet(insRes[i]) &&
12             !phiCongruence[insRes[i].var()].intersect(CFG.liveSet(insRes[j]))
13   {
14         candidateResources.add(insRes[j]);
15   }
16   else if (phiCongruence[insRes[i].var()].intersect(CFG.liveSet(insRes[j]) &&
17             phiCongruence[insRes[j].var()].intersect(CFG.liveSet(insRes[i]))
18   {
19         candidateResources.add(insRes[i]);
20         candidateResources.add(insRes[j]);
```

```
21      }
22      else if (!phiCongruence[insRes[i].var()].intersect(CFG.liveSet(insRes[j]) &&
23             !phiCongruence[insRes[j].var()].intersect(CFG.liveSet(insRes[i]))
24      {
25          insRes[j].setUnResolved();
26          insRes[i].setUnResolved();
27          unresolvedNeighborMap[insRes[i]].add(&insRes[j]);
28          unresolvedNeighborMap[insRes[j]].add(&insRes[i]);
29      }
30  }
```

The routine "handleInterface" takes the indices of two interfering resources, "i" and "j," supplied as arguments, and determines whether the interference is symmetric or asymmetric, as discussed above in the previous subsection. The routine "handleInterface" adds one or both resources indexed by "i" and "j," respectively, to a list of candidate resources for eventual copy instruction insertion, depending on the type of interference that handleInterface determines that exists between the two resources. For example, on lines 6–7, handleInterface determines if the resource indexed by argument "i" occurs in the relevant LiveOut or LiveIn set of the basic block associated with the resource indexed by argument "j," and if the resource indexed by argument "j" does not occur in the relevant LiveOut or LiveIn set of the basic block associated with the resource indexed by argument "i." If so, the interference between the two resources called "unresolvedNeighborMap." Thus, handleInterference determines the type of interference, asymmetric or symmetric, arising from two interfering resources in a φ-instruction and appropriately updates either an instance of a set of resources, called "candidateResources," that stores resources that may require the insertion of copy instructions, or updates an instance of the resourceMap class, called "unresolvedNeighborMap," that stores, for each resource in a φ-instruction, a set of resources that interfere with that resource, but for which insertion of copy instructions have been deferred, as discussed above with reference to FIGS. 19A–20D.

The routine "handleUnresolvedResources" is provided below:

```
1   void handleUnresolvedResources    (set<resource>& candidateResources,
2                                     resourceMap& unresNMap)
3   {
4       resource* x =
5           unresNMap.getUnresolvedResourceWithMaxUnresolvedNeighbors();
6       while (x != NULL)
7       {
8           candidateResources.add(*x);
9           x->setResolved();
10          x = unresNMap.getUnresolvedResourceWithMaxUnresolvedNeighbors();
11      }
12      x = unresNMap.getUnresolvedResourceWithOnlyResolvedNeighbors();
13      while (x != NULL)
14      {
15          candidateResources.delete(*x);
16          x->setResolved();
17          x = unresNMap.getUnresolvedResourceWithOnlyResolvedNeighbors();
18      }
19  }
``` is asymmetric, and the resource indexed by argument "i" is added to a list of candidate resources, on line 9. There are two possible cases of asymmetric interference, and lines 11–12 test for the other possible asymmetric interference. On lines 16–17, handleInterface tests for a symmetric interference like the symmetric interference illustrated in FIGS. 15A–16B. For this type of symmetric interference, copy instructions may need to be inserted into the basic block from which the resource indexed by the argument "i" reaches a φ-instruction, as well as the basic block from which the resource indexed by argument "j" reaches the φ-instruction. Finally, handleInterface, on lines 22–23 above, checks for the second type of symmetric interference illustrated in FIGS. 17A–18E. For this type of interference, as illustrated in FIGS. 19A–20D, insertion of copy instructions is deferred, and the interfering resources are added to an unresolved resources list. In the preferred embodiment of the present invention, these unresolved resources are added to an instance of the class "resourceMap," discussed above, The routine "handleUnresolvedResources" is invoked following the initial analysis of all different pairs of resources within a φ-instruction for resource interferences. The routine "handleUnresolvedResources" first traverses the resourceMap "unresNMap" to find indexing resource pointers associated with sets of resources that contain unresolved resources or, in other words, to find indexing resources with unresolved neighbors. The resourceMap "unresNMap" is traversed starting with the index resource having the most unresolved neighbors and proceeds in decreasing order of the number of unresolved neighbors. This traversal is carried out by the initialization statement on lines 4 and 5 and the while loop on lines 6–11 above. Each indexing resource referenced by resource pointer "x" that references a resource with unresolved neighbors is added to the set of resources called "candidateResources." Then, on line 9, the indexing resource "x" is marked as resolved. Because the unresNMap stores pointers to candidate resources, by setting the unresolved index resource "x" to resolved, on line 9, the resource "x" is immediately resolved with respect to all sets of resource pointers included in the unresNMap. Then, in the second initializing step on line 12 and second while loop on lines 13–18, the unresNMap is traversed again in order to eliminate from "candidateResources" those resources in the unresNMap associated with sets of resource pointers containing only pointers to resolved resources. This second loop therefore prevents insertion of unnecessary copy instructions, as discussed above and illustrated in FIGS. 19A–20D.

The routine "mergeCongruenceClasses," provided below, merges the phi congruence classes associated with all the resources in the set of resources "insRes" provided as an argument to mergeCongruenceClasses.

The routine "mergeCongruenceClasses" is used to merge the congruence classes of all the resources of a φ-instruction, as discussed above in the previous subsection.

The routine "insertCopy," provided below, inserts a copy instruction into the instruction stream "istrm" for the resource "x" used in the phiInstruction "ins." Insertion of a copy instruction results in the creation of a new phi congruence class, corresponding to the new resource created for the inserted copy instruction, and results in updates to the control flow graph and interference graph that represent the SSA-form routine or program.

```
1   void mergeCongruenceClasses(variableMap& phiCongruence, instruction* ins)
2   {
3     int k;
4     set<variable> newSet();
5     set<resource> insRes = ins->getResources();
6
7     for (k = 0; k < insRes.numElements(); k++)
8         newSet += phiCongruence[insRes[k].var()];
9     for (k = 0; k < insRes.numElements(); k++)
10         phiCongruence[insRes[k].var()] = newSet;
11  }
```

```
1   void insertCopy    (resource& x, phiInstruction* ins, variableMap& phiCongruence,
2                      instructionStream& istrm, controlFlowGraph& CFG,
3                      interferenceGraph& intG)
4   {
5     set<block>* blks;
6     set<variable>* live;
7     resource* newRes;
8     int j,k;
9
10    if (x.source())
11    {
12        blks = ins->getBlks(x);
13        for (j = 0; j < blks->numElements(); j++)
14        {
15            newRes = istrm.insertResourceCopy ((*blks)[j], x);
16            ins->substitute (x, newRes);
17            phiCongruence.add(newRes->var());
18            phiCongruence[newRes->var()].add(newRes->var());
19            intG.add(newRes->var());
20            CFG.update((*blks)[j], newRes, x, istrm);
21            live = CFG.liveSet(*newRes);
22            for (k = 0; k < live->numElements(); k++)
23                intG.addEdge((*live)[k], newRes->var());
24        }
25    }
26    else
27    {
28        newRes = insertResourceCopy (x.block(), x);
29        ns->substitute (x, newRes);
30        phiCongruence.add(newRes->var());
31        phiCongruence[newRes->var()].add(newRes->var());
32        intG.add(newRes->var());
33        CFG.update(x.block(), newRes, x, istrm);
34        live = CFG.liveSet(*newRes);
35        for (k = 0; k < live->numElements(); k++)
36            intG.addEdge((*live)[k], newRes->var());
37    }
38  }
```

If the resource "x" is a source, then the statements on lines 12–23 are executed by insertCopy. Otherwise, the statements on lines 28–36 are executed by insertCopy. In the case where the resource "x" is a source, all the basic blocks associated with the variable portion of the resource "x" in the phiInstruction referenced by phiInstruction pointer "ins" are placed into a set of basic blocks "blks" on line 12. This step is necessary because a given variable may be used as a resource more than once in a given φ-instruction. For each use, there will be a different associated basic block. For example, in the φ-instruction x3=φ(x1:L1,x1:L2,x3:L3)

the call to the φ-instruction method "getBlks" will return the set of basic blocks including basic block "L1" and basic block "L2." The statements on lines 15–23 will then be executed for each of the basic blocks in the set "blks." These statements insert a copy instruction, appropriately update the control flow graph and interference graph, and create a new phi congruence class. The routine "insertCopy" inserts a new copy instruction on line 15. Then, on line 16, insertCopy substitutes the new resource created for the new copy instruction into the phiInstruction referenced by the phiInstruction pointer "ins." On lines 17 and 18, insertCopy creates a new phi congruence class for the newly created resource and initializes that phi congruence class to have a single member, namely the newly created resource. On line 19, insertCopy adds the newly created resource to the interference graph. On line 20, insertCopy updates the control flow graph to appropriately add the newly created resource to the LiveOut set for the basic block containing the newly inserted copy instruction, and may remove the resource that is copied in the copy instruction from the LiveOut set associated with the basic block containing the new inserted copy instruction. Finally, on lines 22–23, insertCopy updates the interference graph to add interferences between the newly created resource and any variables in the LiveOut set of the basic block that includes the newly inserted copy instruction. Because there is only one target of the φ-instruction, the code to handle insertion of a copy instruction for a target resource on lines 28–36 does not contain a for loop equivalent to the for loop beginning on line 13. Otherwise, the statements on lines 28–36 are equivalent to the statements on lines 15–23 and have the effect of inserting a copy instruction into the basic block that includes the φ-instruction pointed to by the phiInstruction pointer "ins."

Finally, the routine "eliminatePhiResourceInterferences" is provided below:

```
1    variableMap* eliminatePhiResourceInterferences   (instructionStream& istrm,
2                                                      controlFlowGraph& CFG,
3                                                      interferenceGraph& intG)
4
5    {
6       set<resource> candidateResources;
7       set<resource>* resources;
8       set<resource>* insRes;
9       variableMap* nV;
10      VariableMap& phiCongruence = *(nV = new variableMap);
11      resourceMap unresolvedNeighborMap;
12      phiInstruction* ins;
13      int i, j;
14
15      resources = istrm.getUniquePhiResources();
16      for (i = 0; i < resources->numElements(); i++)
17      {
18           phiCongruence.add((*resources)[i].var());
19           phiCongruence[(*resources)[i].var()].add((*resources)[i].var());
20      }
21
22      ins = CFG.getFirstPhi();
23      while (ins != NULL)
24      {
25           insRes = ins->getResources();
26           for (i = 0; i < insRes->numElements(); i++)
27                unresolvedNeighborMap.add(insRes[i]);
28           for (i = 0; i < insRes->numElements(); i++)
29           {
30                for (j = i + 1; j < insRes->numElements(); j++)
31                {
32                     if (intG.interfere
33                         (phiCongruence[(*insRes)[i].var()], phiCongruence[(*insRes) [j].var()])
34                     )
35                     handleInterference    (phiCongruence, CFG, *insRes,
36                                            candidateResources,
37                                            unresolvedNeighborMap, i, j)
38                }
39           }
40           handleUnresolvedResources (candidateResources, unresolvedNeighborMap);
41           for (k= 0; k < candidateResources.numElements(); k++)
42                insertCopy (candidateResources[k], ins, phiCongruence, istrm, CFG, intG)
43           mergeCongruenceClasses (phiCongruence, ins);
44           unresolvedNeighborMap.reset()
45           candidateResources.reset();
```

-continued

```
46        ins = CFG.getNextPhi();
47      }
48      phiCongruence.removeElementsWithSingletonSets();
49      return nV;
50  }
```

The routine "eliminatePhiResourceInterferences" is the highest-level routine in the preferred embodiment of the present invention. The routine "eliminatePhiResourceInterferences" receives, as arguments, an instructionStream "istrm" that represents an SSA-form intermediate-level code program or routine, a control flow graph "CFG" that represents the basic block and control flow of the SSA-form intermediate-level code program or routine, and an interference graph "intG" that represents interferences between variables in the SSA-form program or routine. The routine "eliminatePhiResourceInterferences" employs nine local variables, declared above on lines 6–13. The set of resources called "candidateResources" is used by eliminatePhiResourceInterferences to store all the resources for which copy instructions need to be inserted into the SSA-form program or routine represented by the instructionStream "istrm." The local variable "resources" is a pointer to a set of resources that will include all the resources associated with all φ-instructions within the SSA-form program or routine represented by "istrm." The local variable "insRes" is a pointer to a set of resources that will include all the resources for a particular φ-instruction. The local variable "nV" is a pointer to a variableMap that is allocated and returned by eliminatePhiResourceInterferences. This variableMap represents phi congruence classes for each resource used by any φ-instruction within the program or routine represented by the instructionStream "istrm." A reference to this allocated variable map is called "phiCongruence." The local variable "unresolvedNeighborMap" is a resourceMap that contains lists of unresolved resources indexed by indexing resources. The set of unresolved resources associated with an indexing resource, called "unresolved neighbors" of the indexing resource, indicates that the indexing resource interferes with each of the unresolved neighbors. The local variable "ins" is a pointer to a φ-instruction used as a loop variable. Integer local variables "i" and "j" are loop variables used to index resources within sets of resources.

On line 15, eliminatePhiResourceInterferences initializes the local variable "resources" to contain the set of all resources used in all φ-instructions within the SSA-form program or routine represented by "istrm." On lines 16–20, eliminatePhiResourceInterferences creates a phi congruence class for each resource in the set "resources" and initializes the phi congruence class for each resource to contain only the resource itself. On line 22, eliminatePhiResourceInterferences initializes the φ-instruction pointer local variable "ins" to point to the first φ-instruction within the SSA-form program or routine. Then, on lines 23–47, eliminatePhiResourceInterferences loops through all the φ-instructions within the SSA-form program or routine represented by the instruction stream "istrm" and checks all combinations of pairs of resources associated with each φ-instruction to identify φ-instruction interferences. Then, eliminatePhiResourceInterferences resolves the identified φ-instruction interferences by inserting copy instructions into the SSA-form program or routine represented by the instruction stream "istrm." On line 25, eliminatePhiResourceInterferences places all the resources associated with the φ-instruction into the local variable "insRes." On lines 26–27, eliminatePhiResourceInterferences initializes the unresolvedNeighborMap by adding an indexing resource for each resource in the set "insRes."

Two nested for loops comprising lines 28–39 are used by eliminatePhiResourceInterferences to select each possible pair of resources associated with the φ-instruction pointed to by φ-instruction pointer "ins." For each possible pair of resources, eliminatePhiResourceInterferences checks, on lines 32–34, whether the two resources interfere according to the interferenceGraph "intG," and, if they do interfere, eliminatePhiResourceInterferences calls the routine "handleInterference" on lines 35–37 to identify the type of interference and to appropriately update either the local variable "candidateResources" or the local variable "unresolvedNeighborMap" so that, in later steps, copy instructions can be inserted where necessary to eliminate the detected interferences. Note that if the same variable is supplied as both the first and second arguments to the method "intG.interfere," on lines 32–34, intG.interfere returns the Boolean value FALSE. On line 40, after all the potential pair-wise interferences have been considered, eliminatePhiResourceInterferences calls the routine "handleUnresolvedResources" to move unresolved resources from the unresolvedNeighborMap to the set of resources "candidateResources" where necessary, and, in other cases, removes resources from candidateResources. This step is required in order to avoid inserting unnecessary copy instructions, as discussed with reference to, and illustrated in, FIGS. 19A–20D. Next, on lines 41–42, eliminatePhiResourceInterferences inserts a copy instruction for each resource remaining in the set of resources "candidateResources." On line 43, eliminatePhiResourceInterferences merges the phi congruence classes of all the resources associated with the φ-instruction pointed to by the loop variable "ins." Then, eliminatePhiResourceInterferences resets the unresolvedNeighborMap and candidateResources in preparation for the next iteration of the loop on lines 44–45. Finally, eliminatePhiResourceInterferences fetches the next φ-instruction from the control flow graph representing the SSA-form program or routine and places the pointer to the next φ-instruction into the loop variable "ins." Once all the φ-instructions in the SSA-form program or routine have been analyzed for interferences, and copy instructions have been inserted in order to eliminate those interferences, eliminatePhiResourceInterferences removes any phi congruence classes from the set of phi congruence classes that contains only one member, and returns a pointer to the phi congruence classes on line 49.

Elimination of Redundant Copies from SSA-form Intermediate-Level Code

Figure 22A:
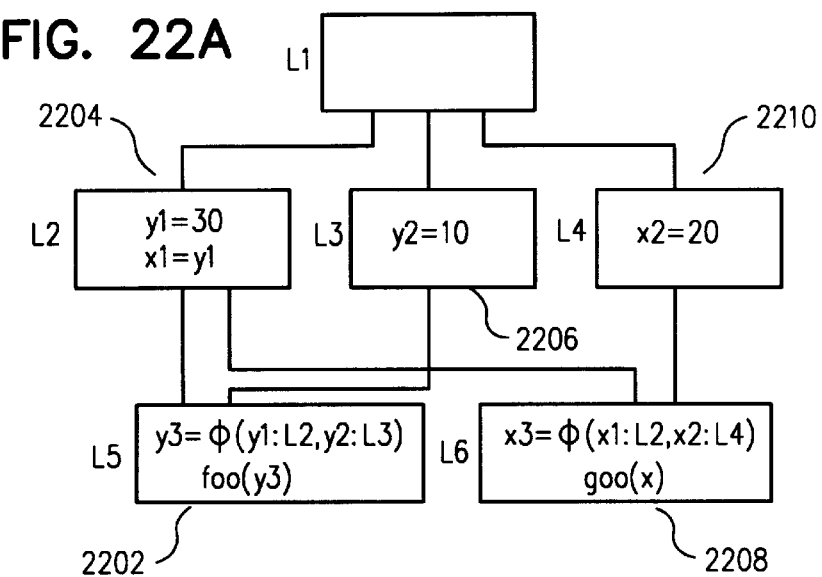
FIGS. 22A–D illustrate an example of a redundant copy instruction.
Figure 22B:
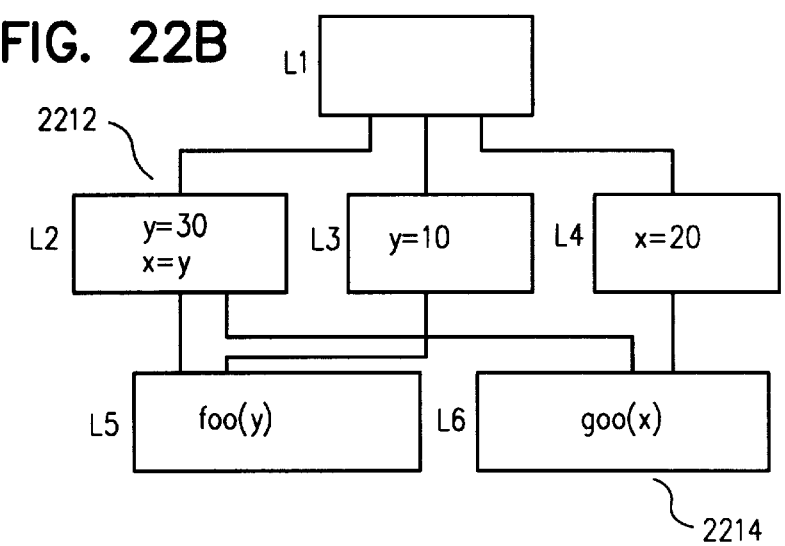

The method for eliminating interferences between resources of φ-instructions, described above, produces phi congruence classes and updated interference and control flow graphs that are useful in eliminating redundant copy instructions that cannot be eliminated by current algorithms. An example of such a redundant copy instruction is presented in FIGS. 22A–B. In FIG. 22A, a φ-instruction in basic block L5 2202 receives the value of variable y1 from basic block L2 2204 and the value of y2 from basic block L3 2206. The second φ-instruction, in basic block L6 2208, receives the value x1 from basic block L2 2204 and the value x2 from basic block L4 2210. If a transition to non-SSA-form is effected, the non-SSA-form code represented by FIG. 22B is obtained. All the resources associated with the first φ-instruction in basic block L5 2202 are replaced in FIG. 22B by the variable y. All resources associated with the second φ-instruction in basic block L6 2208 are replaced in FIG. B with the variable x. However, basic block L2 ends up containing the copy instruction x=y that is redundant. The value 30, assigned to variable y in basic block L2 2212 of FIG. 22B could be transferred directly to basic block L6 2214 without the unnecessary copy instruction.

The routine "resourceCopyRemovable", provided below, implements a method for examining phi congruence classes associated with each variable in a copy instruction along with an interferenceGraph that represents the program or routine in which the copy instruction is located to determine whether the copy instruction can be safely eliminated.

variables "v1" and "v2" can be eliminated, as detected by resourceCopyRemovable on line 9. Otherwise, if the phi congruence classes for both variables "v1" and "v2" are empty, as a result of the call to remove elements with singleton sets on line 48 of the routine "eliminatePhiResourceInterferences," then the copy instruction can be safely removed, as detected by resourceCopyRemovable on lines 10 and 11. If the phi interference class of variable "v1" has no members, the phi congruence class of variable "v2" does have members, but there is no interference between variable "v1" and the set of variables "v2ClassMinusV2," then the copy instruction containing variables "v1" and "v2" can be eliminated, as detected on lines 12–14 by resourceCopyRemovable. If the phi congruence class associated with variable "v2" is empty, the phi congruence class associated with variable "v1" is not empty, but there are no interferences between, variable "v2" and the class "v1ClassMinusV1," then the copy instruction including variables "v1" and "v2" can be eliminated, as detected by resourceCopyRemovable on lines 15–17. Finally, as detected by resourceCopyRemovable on lines 18 and 19, if the two phi congruence classes associated with variables "v1" and variable "v2" are not empty, then the copy instruc-

```
1   Bool resourceCopyRemovable  (variable v1, variable v2, const variableMap&
2                                phiCongruence, const interferenceGraph& intG)
3   {
4      set<variable> v1ClassMinusV1 = phiCongruence[v1];
5      set<variable> v2ClassMinusV2; = phiCongruence[v2]
6      v1ClassMinusV1.delete(v1);
7      v2ClassMinusv2.delete(v2);
8
9      if (phiCongruence[v1].in(v2) || phiCongruence[v2].in(v1)) return TRUE;
10     if (phiCongruence[v1].numElements() == 0 &&
11         phiCongruence[v2].numElements() == 0) return TRUE;
12     else if (phiCongruence[v1].numElements() == 0 &&
13                phiCongruence[v2].numElements() != 0)
14           return !intG.interfere(v1, v2ClassMinusV2);
15     else if (phiCongruence[v2].numElements() == 0 &&
16                phiCongruence[v1].numElements() != 0)
17           return !intG.interfere(v2, v1ClassMinusV1);
18     else return
19                !(intG.interfere (v1, v2ClassMinusV2) || intG.interfere(v2, v1ClassMinusV1));
20  }
```

The routine "resourceCopyRemovable" takes two variables "v1" and "v2" as arguments, as well as the variableMap "phiCongruence" that contains phi congruence classes for each variable produced by a method like that implemented in the routine "eliminatePhiResourceInterferences," described above, and an interferenceGraph "intG" that represents interferences of the program or routine in which the two variables are located. Variable "v1" refers to the target of a copy instruction and variable "v2" is the source of a copy instruction. On lines 4–7, resourceCopyRemovable sets the local variable "v1ClassMinusV1" to contain all the variables in the phi congruence class associated with variable "v1" except for variable "v1." Likewise, resourceCopyRemovable sets the local variable "v2ClassMinusV2" to contain all the variables in the phi congruence class associated with variable "v2" except for variable "v2." Then, on lines 9–19, resourceCopyRemovable applies a series of tests to determine whether a copy instruction that includes variables "v1" and variable "v2" can be safely removed. If the copy instruction can be removed, resourceCopyRemovable returns a Boolean value TRUE, otherwise resourceCopyRemovable returns a Boolean value FALSE. If the phi congruence class associated with variable "v2" contains variable "v1," or vice versa, then the copy instruction containing tion can be eliminated if there are no interferences between variable "v1" and the class "v2ClassMinusV2" or between variable "v2" and the class "v1ClassMinusV1." Otherwise, the copy instruction cannot be removed.

Figure 22C:
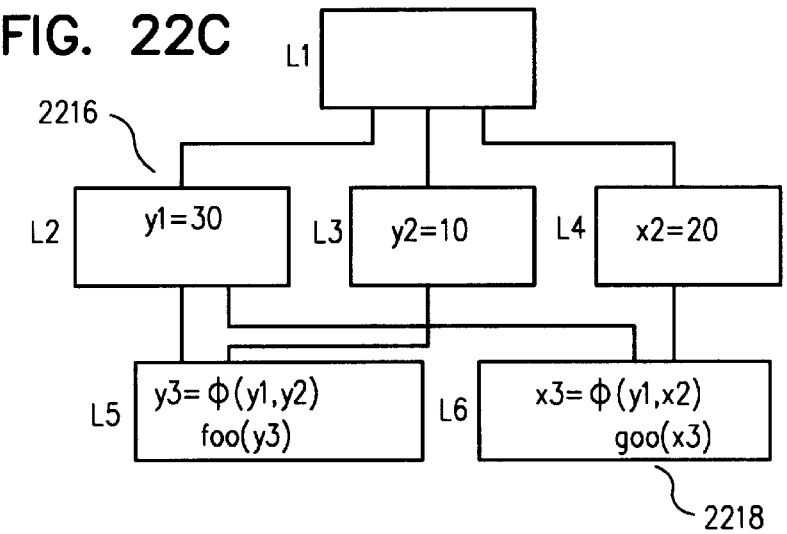
Figure 22D:
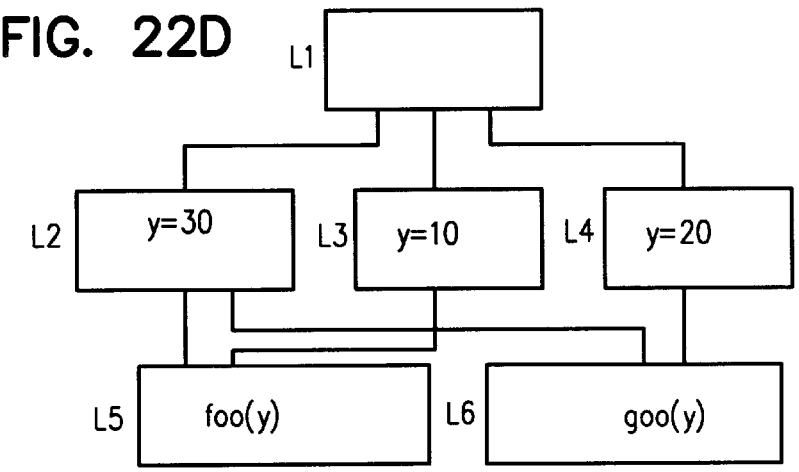

Application of the routine "resourceCopyRemovable" to the code represented by FIG. 22A results in a determination that the copy instruction can be removed. In this case, the variable "v1" represents the variable "x1" in basic block "L2" 2204 of FIG. 22A, and the variable "v2" represents the variable "y1," the source of the copy instruction in basic block "L2" 2204 of FIG. 22A. When all the φ-instructions have been analyzed by the routine "eliminatePhiResourceInteferences," the phi congruence class associated with each the variables "y1," "y2," and "y3" contains "y1," "y2," and "y3." Likewise, the phi congruence class associated with each of the variables "x1," "x2," and "x3" contains "x1," "x2," and "x3." Analyzing the situation, resourceCopyRemovable reaches the statement on lines 18 and 19. At this point, resourceCopyRemovable checks to see if there is an interference between the variable "x1" and the set of variables "[y2, y3]" or between the variable "y1" and the set "[x2, x3]." As can be seen by examination of FIG. 22A, there are no such interferences. In fact, the only interference is between "x1" and "y1." Thus, resourceCopy- Removable returns a Boolean value TRUE indicating that the copy instruction in basic block "L2" 2204 in FIG. 22A can be removed. FIG. 22C shows the state of the control flow graph following removal of the copy instruction "x1= y1" from basic block "L2" 2216. Note that removal of the copy instruction requires that variable "y1" be substituted for variable "x1" in the φ-instruction in basic block "L6" 2218. When the SSA-form code represented by FIG. 22C is transformed back to non-SSA-form code, as shown in FIG. 22D, all resources in both of the instructions are now coalesced into the single variable "y." FIG. 22D is semantically equivalent to FIG. 22A. Thus, the unnecessary copy instruction has been identified for safe removal by the routine "resourceCopyRemovable."

EXAMPLES

Figure 23A:
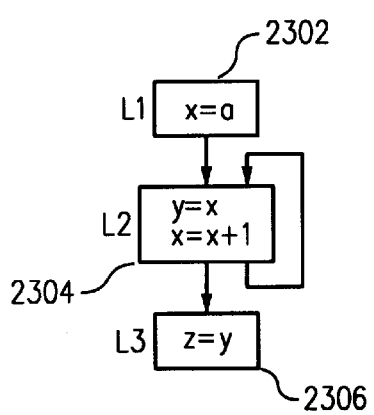
FIGS. 23A–D illustrate the "last copy" problem.
Figure 23B:
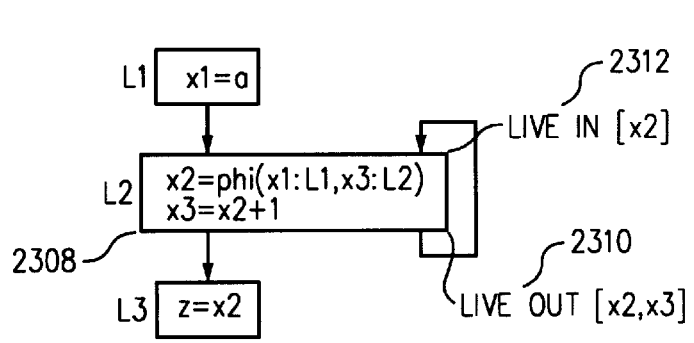
Figure 23C:
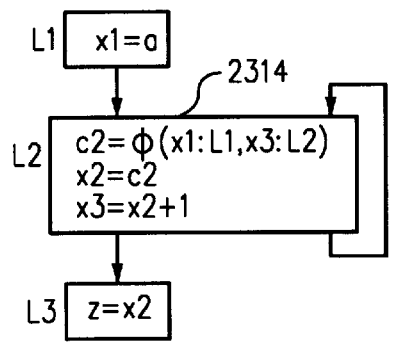
Figure 23D:
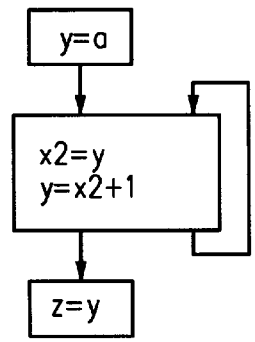

In this subsection, two examples that demonstrate the advantages of the present invention over currently available algorithms will be presented. FIGS. 23A–B illustrate the "lost copy" problem. FIG. 23A is an extract from a control flow graph for a program or routine. In basic block L1 2302, the variable x is assigned the value α. In basic block L2 2304, the variable y is assigned the value contained in the variable x and the variable x is incremented. In basic block L3 2306, the variable z is assigned the value contained in variable y. FIG. 23B represents the SSA-form of the extract represented in FIG. 23A following elimination of copies by copy folding optimization. Certain currently-available algorithms fail to correctly transform the SSA-form code of FIG. 23B back to non-SSA-form or fail to efficiently transform the SSA-form code of FIG. 23B back to non-SSA-form. However, the present method detects the interference between variables x2 and x3 in basic block L2 2308 and, because variable x2 is in the LiveOut set 2310 of basic block L2 2308 and variable x3 is not in the LiveIn set 2312 of basic block L2 2308, the present invention recognizes the interference between variables x2 and x3 as an asymmetric interference and inserts a copy into basic block L2 2308 in order to eliminate the interference. FIG. 23C shows the inserted copy instruction x2=c2 in basic block L2 2314. FIG. 23D shows the non-SSA-form obtained by a transformation of the SSA-form represented by FIG. 23C. The non-SSA-form of FIG. 23D is semantically equivalent to the original code represented by FIG. 23A.

Figure 24A:
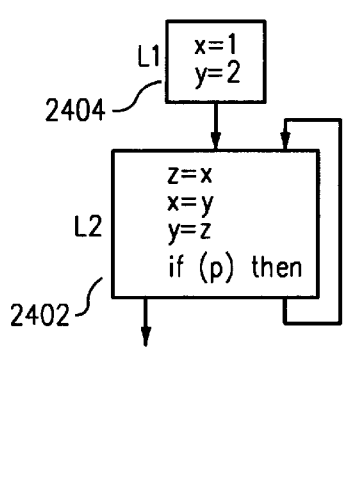
FIGS. 24A–C and 25 A–D illustrate the "swap" problem.
Figure 24B:
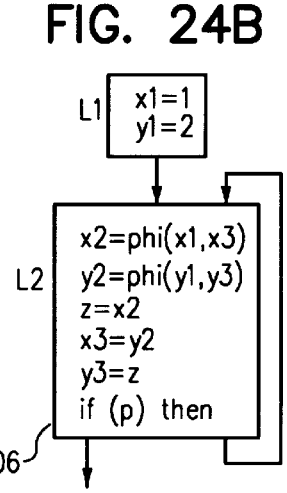
Figure 24C:
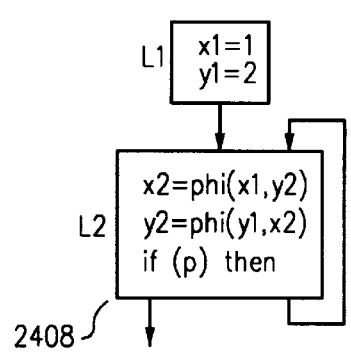
Figure 25A:
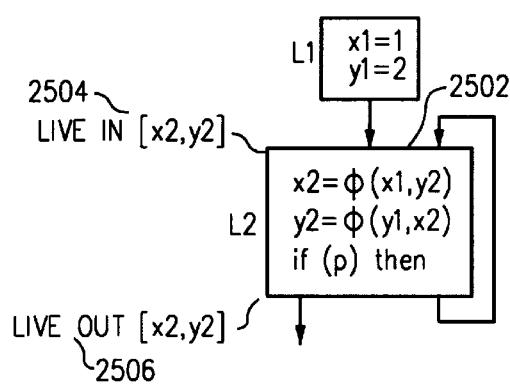
Figure 25C:
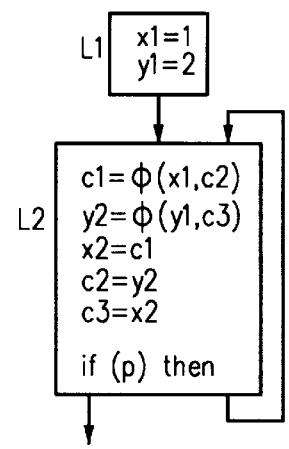
Figure 25B:
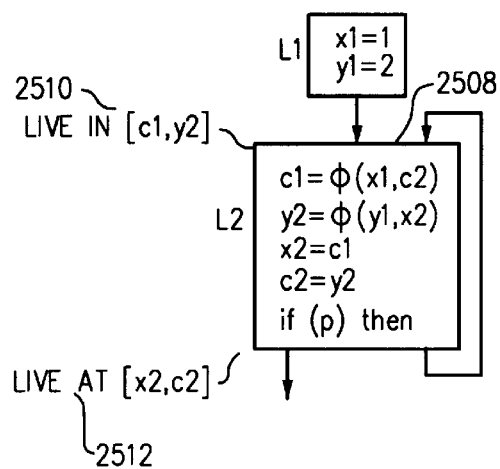
Figure 25D:
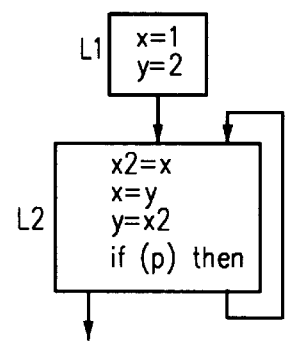

FIGS. 24A–C illustrate the "swap" problem. The original code is represented by the control flow diagram extract shown in FIG. 24A. This code swaps the values, in basic block L2 2402, that are stored in variables x and y in basic block L1 2404. FIG. 24B shows the SSA-form of the code represented by FIG. 24A. FIG. 24C shows the code that results from an optimization phase that identifies as unnecessary, and removes, three assignment statements in basic block L3 in FIG. 24B 2406. Currently available algorithms insert more than a necessary number of copy instructions in order to transform the SSA-form code represented by FIG. 24C back to non-SSA-form. FIGS. 25A–C illustrate how the present invention removes all interferences between resources of the φ-instructions in basic block L2 2408 of FIG. 25C. First, the routine "eliminatePhiResourceInterferences" initiates the phi congruence classes for each resource used in the two φ-instructions in basic block L2 2502 to have a single element equal to the resource itself. The LiveIn 2504 and LiveOut 2506 sets for basic block L2 can be seen in FIG. 25A to include both variables x2 and y2. Now, eliminatePhiResourceInterferences detects the interference in the first φ-instruction in basic block L2 2502 between variables x2 and y2. Because variable y2 is in the LiveIn set 2504 and variable x2 is in the LiveOut set 2506 of basic block L2 2502, this interference is symmetric, and requires insertion of two copies, one for x2 and one for y2, as discussed above and illustrated in FIGS. 15A–16B. FIG. 25B shows the insertion of the copy instructions, with variable c1 substituted for variable x2 in the first φ-instruction and the variable c2 substituted for the variable y2 in the first φ-instruction in basic block L2 2508. Note that the LiveIn 2510 and LiveOut 2512 sets for basic block L2 2508 have been accordingly updated. Also, at this point, the phi congruence classes for resources in the first φ-instruction are merged so that the phi congruence class for variables c1, x1, and c2 each contain all three variables c1, x1, and c2. Now, eliminatePhiResourceInterferences considers the second φ-instruction in basic block L2 2508. The variables x2 and y2 still interfere because both are live in basic block L2 at the same time. In this case, the interference is a symmetric interference in which neither variable x2 nor variable y2 appears in the relevant LiveIn 2510 and LiveOut 2512 sets of the other variable. Thus, as discussed above and illustrated in FIGS. 19A–20D, a single copy instruction needs to be inserted for one of the two variables x2 or y2. In FIG. 25C, a third copy instruction has been inserted for variable x2. FIG. 25B represents the transformation of the SSA-form code represented by FIG. 25C back to non-SSA-form code. Comparison of FIG. 25D with FIG. 24A easily demonstrates that the code represented by both figures is semantically equivalent. Certain currently available algorithms insert more than three copy instructions in order to eliminate the interferences associated with the two φ-instructions in basic block L2 2408 of FIG. 24C.

Although the present invention has been described in terms of a particular embodiment, it is not intended that the invention be limited to this embodiment. Modifications within the spirit of the invention will be apparent to those skilled in the art. For example, the above-described method for eliminating interferences between φ-instructions, as well as the above-described method for eliminating redundant copy instructions from SSA-form intermediate-level code, may be included in any number of different types of compilers for compiling any number of different types of source-language programs written in any number of different programming languages to equivalent assembly-language and/or machine-code instruction programs for execution on any number of different types of computer systems. The method of the present invention may be implemented in any number of different programming languages and may be implemented in many different ways. Different numbers of routines may be used in the implementation, and various different algorithms may be used to effect the subtasks described above in the pseudo-code implementation of the preferred embodiment of the present invention. For example, the routine "eliminatePhiInstructionInterferences" may traverse the control flow graph in any number of different traversal orders. Different types of data structures can be used to store and accumulate the unresolved resources lists, phi congruence classes, and other information used by the routine "eliminatePhiInstructionInterferences" to detect and eliminate the different types of interferences that may be present in an SSA-form intermediate-level code program or routine.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for detecting and eliminating interferences between resources of phi instructions in static-single-assignment-form code, the method comprising:

selecting each phi instruction of the static-single-assignment-form code;

for each selected phi instruction, analyzing resources of the selected phi instruction to identify variables used as resources in the selected phi instruction that are members of interfering phi congruence classes, a first phi congruence class interfering with a second phi congruence class when a variable in the first phi congruence class interferes with a variable in the second phi congruence class; and inserting copy instructions into the static-single-assignment-form code to remove a number of variables of the identified variables from phi instructions so that no pair of variables used as resources in any phi instruction within the static-single-assignment-form code are members of two interfering phi congruence classes.

2. The method of claim 1 further including:

initializing a phi congruence class associated with each resource used in any phi instruction within the static-single-assignment-form code to include only that resource prior to selecting each phi instruction; and after analyzing resources of the selected phi instruction, merging the phi congruence classes of all resources used as target and source resources in the selected phi instruction.

3. The method of claim 2 wherein analyzing resources of the selected phi instruction further includes:

selecting each possible pair of resources used as target and source resources in the selected phi instruction;

for each selected pair of resources, if any resource selected from the phi congruence class associated with the first resource of the selected pair of resources interferes anywhere in the static-single-assignment-form code with a resource selected from the phi congruence class of the second resource of the selected pair of resources, analyzing the interference to determine whether a copy instruction may need to be inserted into the static-single-assignment-form code for either or both resources of the selected pair of resources in order to eliminate the interference; and storing an indication of each resource and location for which a copy instruction may need to be inserted into the static-single-assignment-form code.

4. The method of claim 3 further including, after analyzing resources of the selected phi instruction and prior to inserting copy instructions into the static-single-assignment-form code:

removing unnecessary indications of resources and locations for copy instructions.

5. The method of claim 4 wherein inserting a copy instruction for a stored indication of a resource and location into the static-single-assignment-form code further includes:

generating a new variable that does not occur in the static-single-assignment-form code;

generating a copy instruction that copies the value stored in the resource to the new variable; and inserting the copy instruction into the static-single-assignment-form code at indicated location.

6. The method of claim 5 further including:

receiving an interference graph that represents interferences between variables in the static-single-assignment-form code;

using the received interference graph to determine if any resource selected from the phi congruence class associated with the first resource of the selected pair of resources interferes anywhere in the static-single-assignment-form code with a resource selected from the phi congruence class of the second resource of the selected pair of resources; and identifying new interferences between the new variable generated for a copy instruction inserted into the static-single-assignment-form code and updating the received interference graph to include the new interferences.

7. The method of claim 5 further including:

receiving a control flow graph, the control flow graph augmented to include a LiveIn set for each basic block that includes each variable that is live at the beginning of the basic block and augmented to include a LiveOut set for each basic block that includes each variable that is live at the end of the basic block;

using the received control flow graph to analyze interferences between selected pairs of phi instruction resources to determine whether a copy instruction may need to be inserted into the static-single-assignment-form code for either or both resources of the selected pair of resources in order to eliminate the interference; and updating the received interference graph to reflect changes in the LiveIn and LiveOut sets associated with the basic blocks arising from the insertion of each copy instruction.

8. The method of claim 7 wherein the indication of a resource and location stored for each resource and location for which a copy instruction may need to be inserted into the static-single-assignment-form code comprises an indication of the resource and an indication of a basic block that precedes a basic block containing the selected phi instruction in the control flow graph and from which the resource arrives, during execution, at the basic block containing the selected phi instruction.

9. The method of claim 8 wherein analyzing the interference to determine whether a copy instruction may need to be inserted into the static-single-assignment-form code for either or both resources of the selected pair of resources in order to eliminate the interference further includes:

identifying a basic block that includes the phi instruction;

identifying a first basic block from which a first resource of the pair of selected resources reaches the basic block that contains the phi instruction;

identifying a second basic block from which a second resource of the pair of selected resources reaches the basic block that contains the phi instruction;

identifying a first live set associated with the first resource of the pair of selected resources, the first live set being the LiveOut set of the first basic block when the first resource of the pair of selected resources is a source resource and the LiveIn set of the first basic block when the first resource is a target resource;

identifying a second live set associated with the second resource of the pair of selected resources, the second live set being the LiveOut set of the second basic block when the second resource of the pair of selected resources is a source resource and the LiveIn set of the second basic block when the second resource is a target resource;

identifying a first phi congruence class associated with the first resource;

identifying a second phi congruence class associated with the second resource;

when a variable in first phi congruence class occurs in the second live set and no variable in the second phi congruence class occurs in the first live set,
determining that one copy instruction may need to be inserted into the first basic block;

when a variable in second phi congruence class occurs in the first live set and no variable in the first phi congruence class occurs in the second live set,
determining that one copy instruction may need to be inserted into the second basic block;

when a variable in the first phi congruence class occurs in the second live set and a variable in the second phi congruence class occurs in the first live set,
determining that one copy instruction may need to be inserted into the first basic block and that one copy instruction may need to be inserted into the second basic block;

when no variable in the first phi congruence class occurs in the second live set and no variable in the second phi congruence class occurs in the first live set,
determining that one copy instruction may need to be inserted into either the first basic block or the second basic block.

10. The method of claim 9 wherein removing unnecessary indications of resources and locations for copy instructions includes:
successively identifying indications of resources and locations stored, while analyzing interferences, because no variable in the first phi congruence class occurs in the second live set and no variable in the second phi congruence class occurs in the first live set; and
removing an identified indication of a resource and location for which a copy instruction no longer needs to be inserted into the static-single-assignment-form code because a copy instruction that has already been inserted into the static-single-assignment-form code has eliminated the interference that caused the identified indication to be stored.

11. The method of claim 1 carried out during compilation of a source-code routine to create either an assembly-language routine or a machine-code routine, the method further including:
receiving a source-code routine;
transforming the source program into intermediate-level static-single-assignment-form code;
optimizing the intermediate-level static-single-assignment-form code;
after detecting and eliminating interferences between resources of phi instructions in the optimized intermediate-level static-single-assignment-form code, transforming the optimized intermediate-level static-single-assignment-form code to optimized intermediate-level non-static-single-assignment-form code; and
transforming the optimized intermediate-level non-static-single-assignment-form code into either an assembly-language routine or a machine-code routine.

12. A computer-readable medium containing computer instructions that implement a method to detect and eliminate interferences between resources of phi instructions in static-single-assignment-form code by:
selecting each phi instruction of the static-single-assignment-form code;
for each selected phi instruction,
identifying variables used as resources in the selected phi instruction that are members of interfering phi congruence classes, a first phi congruence class interfering with a second phi congruence class when a variable member of the first phi congruence class interferes with a variable in the second phi congruence class; and
inserting copy instructions into the static-single-assignment-form code to remove a number of variables of the identified variables from phi instructions so that no pair of variables used as resources in any phi instruction within the static-single-assignment-form code are members of two interfering phi congruence classes.

13. A method for determining whether a copy instruction in static-single-assignment-form code is redundant, the method including:
receiving an indication of a copy instruction within the static-single-assignment-form code, the indicated copy instruction comprising a target variable and a source variable;
receiving an interference graph that represents interferences between variables in the static-single-assignment-form code;
receiving a source phi congruence class and a target phi congruence class for the source variable and for the target variable;
receiving a control flow graph, the control flow graph augmented to include a LiveIn set for each basic block that includes each variable that is live at the beginning of the basic block and augmented to include a LiveOut set for each basic block that includes each variable that is live at the end of the basic block;
analyzing the source and target variables of the indicated copy instruction with respect to the received control flow graph, interference graph, and phi congruence classes to determine whether the indicated copy instruction is redundant.

14. The method of claim 13 wherein analyzing the source and target variables of the indicated copy instruction with respect to the received control flow graph, interference graph, and phi congruence classes further includes:
computing a source self-eliminated phi-congruence class from the source phi congruence class by removing the source variable from the source phi congruence class if it is a member of the source phi congruence class;
computing a target self-eliminated phi-congruence class from the target phi congruence class by removing the target variable from the target phi congruence class if it is a member of the target phi congruence class;
when the source variable is in the target phi-congruence class, returning an indication that the copy instruction is redundant;

when the target variable is in the source phi-congruence class, returning an indication that the copy instruction is redundant;

when the source and target congruence classes both have no members, returning an indication that the copy instruction is redundant;

when the source congruence class has members and the target congruence class has no members,
if the source variable interferes with any member in the target self-eliminated phi-congruence class, returning an indication that the copy instruction is not redundant, and otherwise returning an indication that the copy instruction is redundant;

when the target congruence class has members and the source congruence class has no members,
if the target variable interferes with any member in the source self-eliminated phi-congruence class, returning an indication that the copy instruction is not redundant, and otherwise returning an indication that the copy instruction is redundant; and when the source congruence class has members and the target congruence class has members,
if the source variable interferes with any member in the target self-eliminated phi-congruence class or the target variable interferes with any member in the source self-eliminated phi-congruence class, returning an indication that the copy instruction is not redundant, and otherwise returning an indication that the copy instruction is redundant.

15. A system for detecting and eliminating interferences between resources of phi instructions in static-single-assignment-form code and for determining whether a copy instruction in static-single-assignment-form code is redundant, the system comprising:
a computer system that executes computer programs and that includes a memory;
static-single-assignment-form code stored in the computer system; and
a program executed on the computer system that comprises:
a phi congruence class generator that generates phi congruence classes that each contain variables from the static-single-assignment-form code that are related by their use as resources in phi instructions within the static-single-assignment-form code;
a phi instruction resource interference detection component that successively analyzes each phi instruction within the static-single-assignment-form code to identify phi instruction resource interferences by identifying resources of the phi instruction that are members of phi congruence classes that contain members that interfere with one another at some point in the static-single-assignment-form code; and
a phi instruction resource interference elimination component that inserts copy instructions into the static-single-assignment-form code in order to eliminate the identified phi instruction resource interferences.

16. The program executed on the computer system of claim 15 further including:
an interference graph generating component that generates an interference graph that contains indications of all interferences between different variables within the static-single-assignment-form code; and
a control flow graph generating component that generates a control flow graph that includes indications of basic blocks of instructions within the static-single-assignment-form code and the flow of execution between the basic blocks, each basic block associated with a LiveIn set that includes each variable that is live at the beginning of the basic block and associated with a LiveOut set that includes each variable that is live at the end of the basic block.

17. The system of claim 16 wherein the phi instruction resource interference detection component initializes a phi congruence class associated with each particular resource used in any phi instruction within the static-single-assignment-form code to include only that particular resource and, after the phi instruction resource interference detection component analyzes a phi instruction, merges the phi congruence classes of all resources used as target and source resources in the selected phi instruction.

18. The system of claim 16 wherein the phi instruction resource interference detection component, for each selected phi instruction,
selects each possible pair of resources used as target and source resources in the selected phi instruction, and
for each selected pair of resources in which the first resource of the selected pair of resources interferes anywhere in the static-single-assignment-form code with a resource selected from the phi congruence class of the second resource of the selected pair of resources,
analyzes the interference to determine whether a copy instruction may need to be inserted into the static-single-assignment-form code for either or both resources of the selected pair of resources in order to eliminate the interference, and
stores in the memory of the computer system an indication of each resource and location for which a copy instruction may need to be inserted into the static-single-assignment-form code.

19. The system of claim 18 wherein the phi instruction resource interference elimination component removes from the memory of the computer system indications of resources and locations for copy instructions made unnecessary by another indication of a resource and location for a copy instruction stored in the memory of the computer system.

20. The system of claim 19 wherein the phi instruction resource interference elimination component inserts a copy instruction for a stored indication of a resource and location into the static-single-assignment-form code by:
generating a new variable that does not occur in the static-single-assignment-form code;
generating a copy instruction that copies the value stored in the resource to the new variable; and
inserting the copy instruction into the static-single-assignment-form code at indicated location.

21. The system of claim 20 wherein the phi instruction resource interference elimination component instructs the interference graph generating component to update the interference graph and instructs the control flow graph generating component to update the control flow graph following the insertion of each copy instruction.

22. The system of claim 21 wherein the indication of a resource and location stored in the memory of the computer system for each resource and location for which a copy instruction may need to be inserted into the static-single-assignment-form code comprises an indication of the resource and an indication of a basic block that precedes a basic block containing the selected phi instruction in the control flow graph and from which the resource arrives, during execution, at the basic block containing the selected phi instruction.

23. The system of claim 22 wherein the phi instruction resource interference detection component analyzes an interference to determine whether a copy instruction may need to be inserted into the static-single-assignment-form code for either or both resources of a selected pair of resources by:
- identifying a first phi congruence class associated with the first resource;
- identifying a second phi congruence class associated with the second resource;
- when a variable in first phi congruence class occurs in the second live set and no variable in the second phi congruence class occurs in the first live set,
    - determining that one copy instruction may need to be inserted into the first basic block;
- when a variable in second phi congruence class occurs in the first live set and no variable in the first phi congruence class occurs in the second live set,
    - determining that one copy instruction may need to be inserted into the second basic block;
- when a variable in the first phi congruence class occurs in the second live set and a variable in the second phi congruence class occurs in the first live set,
    - determining that one copy instruction may need to be inserted into the first basic block and that one copy instruction may need to be inserted into the second basic block;
- when no variable in the first phi congruence class occurs in the second live set and no variable in the second phi congruence class occurs in the first live set,
    - determining that one copy instruction may need to be inserted into either the first basic block or the second basic block.

24. A system for eliminating redundant copy instructions in static-single-assignment-form code, the system comprising:
- a computer system that executes computer programs;
- static-single-assignment-form code stored in the computer system; and
- a program executed on the computer system that comprises
    - a phi congruence class generator that generates phi congruence classes that each contain variables from the static-single-assignment-form code that are related by their use as resources in phi instructions within the static-single-assignment-form code;
    - an interference graph generating component that generates an interference graph that contains indications of all interferences between different variables within the static-single-assignment-form code;
    - a control flow graph generating component that generates a control flow graph that includes indications of basic blocks of instructions within the static-single-assignment-form code and the flow of execution between the basic blocks, each basic block associated with a LiveIn set that includes each variable that is live at the beginning of the basic block and associated with a LiveOut set that includes each variable that is live at the end of the basic block;
    - a redundant copy instruction detector that analyzes the source and target variables of copy instructions in the static-single-assignment-form code with reference to the interference graph, the control flow graph, and the phi congruence classes to identify copy instructions that are redundant; and
    - a redundant copy instruction elimination component that eliminates the identified redundant copy instructions.

25. The system of claim 24 wherein the redundant copy instruction detector analyzes the source and target variables of the indicated copy instruction with respect to the received control flow graph, interference graph, and phi congruence classes by:
- computing a source self-eliminated phi-congruence class from the source phi congruence class by removing the source variable from the source phi congruence class if it is a member of the source phi congruence class;
- computing a target self-eliminated phi-congruence class from the target phi congruence class by removing the target variable from the target phi congruence class if it is a member of the target phi congruence class;
- when the source variable is in the target phi-congruence class, returning an indication that the copy instruction is redundant;
- when the target variable is in the source phi-congruence class, returning an indication that the copy instruction is redundant;
- when the source and target congruence classes both have no members, returning an indication that the copy instruction is redundant;
- when the source congruence class has members and the target congruence class has no members,
    - if the source variable interferes with any member in the target self-eliminated phi-congruence class, returning an indication that the copy instruction is not redundant, and otherwise returning an indication that the copy instruction is redundant;
- when the target congruence class has members and the source congruence class has no members,
    - if the target variable interferes with any member in the source self-eliminated phi-congruence class, returning an indication that the copy instruction is not redundant, and otherwise returning an indication that the copy instruction is redundant;
- when the source congruence class has members and the target congruence class has members,
    - if the source variable interferes with any member in the target self-eliminated phi-congruence class or the target variable interferes with any member in the source self-eliminated phi-congruence class, returning an indication that the copy instruction is not redundant, and otherwise returning an indication that the copy instruction is redundant.

* * * * *